(12) United States Patent
Mahanthappa et al.

(10) Patent No.: US 9,394,386 B1
(45) Date of Patent: Jul. 19, 2016

(54) POLYMERIZABLE MIXTURES CONTAINING IONIC GEMINI SURFACTANTS; AND LYOTROPIC LIQUID CRYSTALS, POLYMERS, AND MEMBRANES MADE THEREFROM

(71) Applicant: WISCONSIN ALUMNI RESEARCH FOUNDATION, Madison, WI (US)

(72) Inventors: Mahesh Kalyana Mahanthappa, Madison, WI (US); James Jennings, Madison, WI (US)

(73) Assignees: WISCONSIN ALUMNI RESEARCH FOUNDATION, Madison, WI (US); NATIONAL SCIENCE FOUNDATION, Arlington, VA (US)

( * ) Notice: Subject to any disclaimer, the term of this patent is extended or adjusted under 35 U.S.C. 154(b) by 0 days.

(21) Appl. No.: 14/610,116

(22) Filed: Jan. 30, 2015

(51) Int. Cl.
*C08F 2/46* (2006.01)
*C08F 2/50* (2006.01)
*C08G 61/04* (2006.01)
*B29C 71/04* (2006.01)
*C08F 22/02* (2006.01)
*C08J 9/00* (2006.01)
*C09K 19/00* (2006.01)

(52) U.S. Cl.
CPC . *C08F 22/02* (2013.01); *C08J 9/00* (2013.01); *C09K 19/00* (2013.01); *C08J 2333/02* (2013.01)

(58) Field of Classification Search
CPC ............. C08F 22/02; C08J 9/00; C09K 19/00
USPC .................. 522/6, 71, 189, 184, 1; 520/1
See application file for complete search history.

(56) References Cited

U.S. PATENT DOCUMENTS

| | | | |
|---|---|---|---|
| 6,046,292 A | 4/2000 | Lochhead et al. | |
| 7,090,788 B2 | 8/2006 | Elliott | |
| 7,604,129 B2 | 10/2009 | Gin et al. | |
| 8,834,743 B2 | 9/2014 | Mahanthappa et al. | |
| 2004/0211939 A1 | 10/2004 | Elliott | |
| 2006/0096922 A1 | 5/2006 | Gin et al. | |
| 2007/0218371 A1 | 9/2007 | Elliott et al. | |
| 2008/0029735 A1 | 2/2008 | Gin et al. | |
| 2008/0089924 A1 | 4/2008 | Nojima et al. | |
| 2009/0173693 A1 | 7/2009 | Gin et al. | |
| 2010/0075195 A1 | 3/2010 | Elliott et al. | |
| 2012/0211424 A1 | 8/2012 | Gabriel et al. | |
| 2013/0190417 A1* | 7/2013 | Mahanthappa ..... | C09K 19/0283 521/149 |

FOREIGN PATENT DOCUMENTS

WO  2004060531 A1  7/2004

OTHER PUBLICATIONS

Wang et al, Structural Effect of Thiol-Compounds on the Thiol-ene Based UV curable adhesieve, Nov. 29, 2013, Applied Mechanics and materials, vol. 469, 162-166.*
Alami et al.; "Alkanediyl-Alpha, Omega-Bis(Dimethylalkylammonium Bromide) Surfactants. 2. Structure of the Lyotropic Mesophases in the Presence of Water"; Langmuir; 9; pp. 940-944; (1993).
Brun et al.; "The Fraction of Associated Counterions and Singly Dispersed Amphiphiles in Micellar Systems from Ion-Exchange Membrane Electrode Measurements"; J. Colloid Interfac. Sci.; 63; pp. 590-592; (1978).
Diamant et al.; "Models of Gemini Surfactants" in Surfactant Science Series, Zana, R., Ed.; Marcel Dekker, Inc., New York; vol. 117; p. 37; (2004).
Dix et al.; "Lyotropic and Interfacial Behavior of an Anionic Gemini Surfactant"; J. Colloid Interfac. Sci.; 296; pp. 762-765; (2006).
Fairhurst et al.; "Lyotropic Surfactant Liquid Crystals"; in Handbook of Liquid Crystals, Dietrich Demus, Editor; Wiley-VCH, vol. 3; pp. 341-392; (1998).
Gin et al.; "Polymerized Lyotropic Liquid Crystal Assemblies for Membrane Applications"; Macromol. Rapid Commun.; 29; pp. 367-389; (2008).
Han et al.; "A Tri-Continuous Mesoporous Material With a Silica Pore Wall Following a Hexagonal Minimal Surface"; Nature Chem; 1; pp. 123-127; (2009).
Hatakeyama et al.; Nanoporous, Bicontinuous Cubic Lyotropic Liquid Crystal Networks Via Polymerizable Gemini Ammonium Surfactants; with Abstract; Chem. Matter.; 22(16); pp. 4525-4527; (2010).
Heathcock et al.; "Daphniphyllum Alkaloids. 12. A Proposed Biosynthesis of the Pentacyclic Skeleton. proto-Daphniphylline"; J. Org. Chem.; 57; pp. 2554-2566; (1992).
Hentze et al.; "Lyotropic Mesophases of Poly(ethylene oxide)-b-poly(butadiene)Diblock Copolymers and Their Cross-Linking to Generate Ordered Gels"; Macromolecules; 32; pp. 5803-5809; (1999).
Hoag et al.; "Cross-Linkable Liquid Crystal Monomers Containing 1,3-Diene Tail Systems"; Macromolecules; 33(23); pp. 8549-8558; (2000).
Hoyle et al.; "Thiol-Ene Click Chemistry"; Polymer Chemistry; Angew. Chem. Int. Ed. 49; pp. 1540-1573; (2010).
Hyde, Stephen T.; "Identification of Lyotropic Liquid Crystalline Mesophases"; from Chapter 16, Handbook of Applied Surface and Colloid Chemistry; vols. 1-2; John Wiley & Sons; pp. 299-332; (2002).
Israelachvili, J. N., Chapter 17 in Agregation of Amphiphilic Molecules Into Micelles, Bilayers, Vesicles and Biological Membranes_ Intermolecular and Surface Forces2, 2nd Ed.; Academic Press London; pp. 367-395; (1991).
Johansson et al.; "Membrane Protein Crystallization From Lipidic Phases"; Curr. Opin. Struct. Biol.; 19; pp. 372-378; (2009).

(Continued)

*Primary Examiner* — Ling Choi
*Assistant Examiner* — Jessica E Whiteley
(74) *Attorney, Agent, or Firm* — Cantor Colburn LLP

(57) ABSTRACT

Disclosed are polymerizable mixtures comprising a functionalized ionic gemini surfactant and a thiol-ene crosslinking agent. The polymerizable mixtures that further comprise a polar solvent may be used to form the surfactant into a triply periodic multiply continuous lyotropic phase in the presence of the crosslinking agent. Upon crosslinking, the lyotropic phase morphology is substantially retained.

22 Claims, 5 Drawing Sheets

(56) References Cited

OTHER PUBLICATIONS

Kato et al.; "Functional Liquid-Crystalline Assemblies: Self-Organized Soft Materials"; Angew. Chem. Int. Ed.; 45; pp. 38-68; (2006).

Kerr et al.; "New Type of Li Ion Conductor With 3D Interconnected Nanopores Via Polymerization of a Liquid Organic Electrolyte-Filled Lyotropic Liquid-Crystal Assembly"; J. Am. Chem. Soc.; 131; pp. 15972-15973; (2009).

Kotha et al.; "Diversity-Oriented Approach to Macrocyclic Cyclophane Derivatives via Ring-Closing Metathesis"; Synlett; 23; pp. 2183-2188; (2012).

Leal et al.; "Highly Efficient Gene Silencing Activity of siRNA Embedded in a Nanostructured Gyroid Cubic Lipid Matrix"; J. Am. Chem. Soc.; 132; pp. 16841-16847; (2010).

Matsen et al.; "Origins of Complex Self-Assembly in Block Copolymers"; Macromolecules; 29; pp. 7641-7644; (1996).

Menger et al.; "Gemini Surfactants"; Angew. Chem. Int. Ed.; 39; pp. 1906-1920; (2000).

Morgan et al.; "Thiol/Ene Photocurable Polymers"; Journal of Polymer Science; Polymer Chemistry Edition; 15; pp. 627-645; (1977).

Pfeffer et al.; "Alpha Anions of Carboxylic-Acids. 2. Formation and Alkylation of Alpha-Metalated Aliphatic Acids"; Journal of Organic Chemistry; 37; p. 451; (1972).

Pindzola et al.; "Cross-Linked Normal Hexagonal and Bicontinuous Cubic Assemblies Via Polymerizable Gemini Amphiphiles"; J. Am. Chem. Soc.; 125; pp. 2940-2949; (2003).

Pindzola et al.; "Lyotropic Liquid-Crystalline Phase Behavior of Some Alkyltrimethylphosphonium Bromides"; Langmuir; 16; pp. 6750-6753; (2000).

Rummel et al.; "Lipidic Cubic Phases: New Matrixes for the Three-Deimensional Crystallization of Membrane Proteins"; J. Struct. Biol.; 121; pp. 82-91; (1998).

Seddon, J. M.; "Structure of the Inverted Hexagonal (HII) Phase, and Non-Lamellar Phase Transitions of Lipids"; Biochim. Biophys. Acta; 1031; pp. 1-69; (1990).

Shearman et al.; "Calculations of and Evidence for Chain Packing Stress in Inverse Lyotropic Bicontinuous Cubic Phases"; Langmuir; 23; pp. 7276-7285; (2007).

Shearman et al.; "Ordered Micellar and Inverse Micellar Lyotropic Phases"; Liq. Cryst.; 37; pp. 679-694; (2010).

Sievens-Figueroa et al.; "Polymerization Kinetics and Nanostructure Evolution of Reactive Lyotropic Liquid Crystals with Different Reactive Group Position"; Macromolecules; 42; pp. 9243-9250; (2009).

Sorenson et al.; "New Type of Membrane Material for Water Desalination Based on a Cross-Linked Bicontinuous Cubic Lyotropic Liquid Crystal Assembly"; J. Am. Chem. Soc.; 133; pp. 14928-14931; (2011).

Svenson S.; "Self-assembly and Self-organization: Important Processes, but Can We Predict Them?"; J. Disper. Sci. Tech.; 25; pp. 101-118; (2004).

Tolstikov et al.; "Telomerization of Butadiene and Isoprene With Sulfones Containing Active Methine and Methylene Groups, Catalyzed by Palladium Complexes"; Bulletin of the Academy of Sciences of the USSR, Division of Chemical Science; 32(3); pp. 529-536.

U.S. Appl. No. 13/472,817, filed May 16, 2012; Non-final Office Action; mailed Feb. 13, 2014; 14 pages.

Ulrich F. Heiser et al.; Simple and High Yield Synthesis of (±)10,10'-dimethyl-dotriacontan-1,1'-diol as a Building Block for Branched Bola Compounds. Preparation of (±)10,10'-dimethyl-dotriaconta-1,1'-diyl-bis[2-(trimetylammino) ethyl phosphate] and t.

Zhou et al.; "New Type of Membrane Material for Water Desalination Based on a Cross-Linked Bicontinuous Cubic Lyotropic Liquid Crystal Assembly"; J. Am. Chem. Soc.; 129; pp. 9574-9575; (2007).

* cited by examiner

FIG. 2A
FIG. 2B
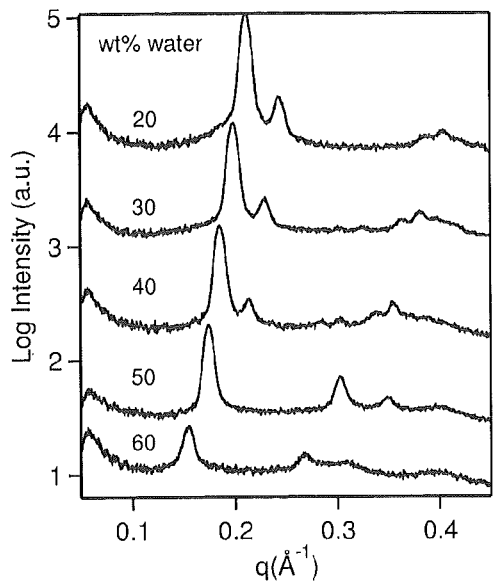
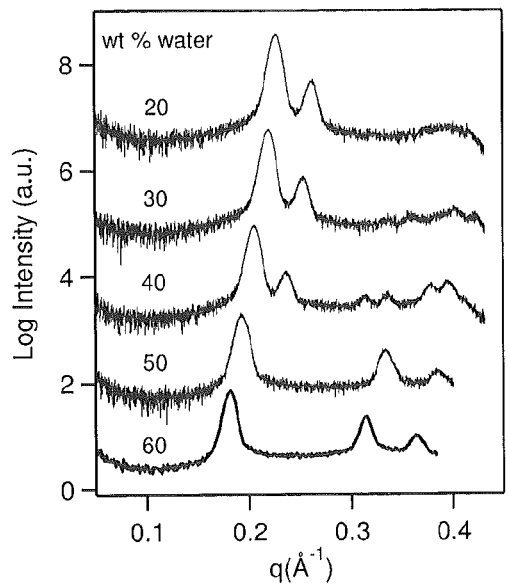
FIG. 3
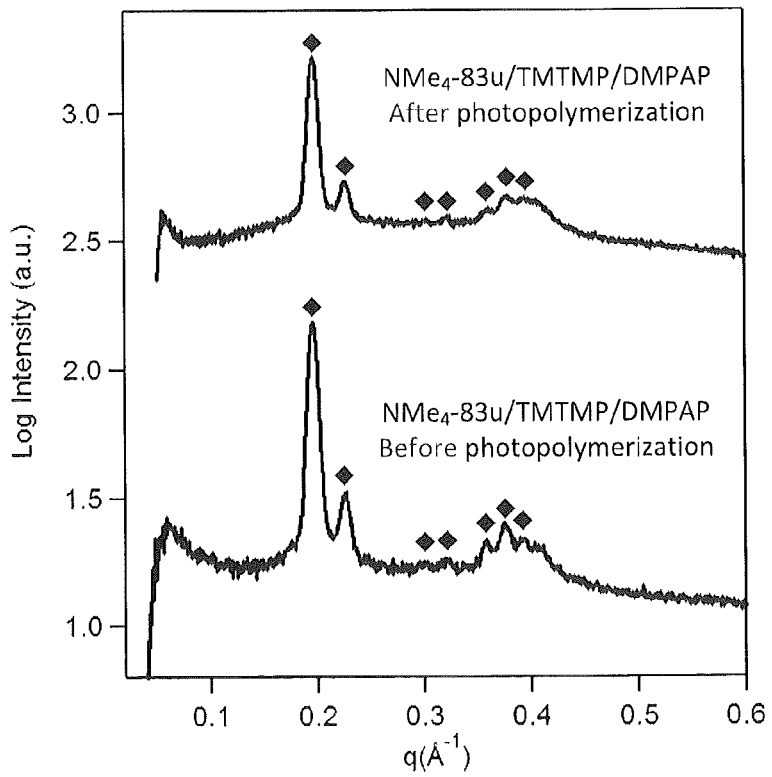

POLYMERIZABLE MIXTURES CONTAINING IONIC GEMINI SURFACTANTS; AND LYOTROPIC LIQUID CRYSTALS, POLYMERS, AND MEMBRANES MADE THEREFROM

STATEMENT REGARDING FEDERALLY SPONSORED RESEARCH & DEVELOPMENT

This invention was made with government support under 1121288 awarded by the National Science Foundation. The government has certain rights in the invention.

FIELD OF THE DISCLOSURE

The field of the disclosure relates to polymerizable mixtures containing ionic gemini surfactants, and lyotropic liquid crystals, polymers and membranes prepared therefrom.

BACKGROUND OF THE DISCLOSURE

Lyotropic liquid crystal (LLC) assemblies have garnered widespread attention in disparate areas of chemistry, by virtue of their utility in highly selective chemical separations such as water desalination and selective ion-transporting membranes, as templates for mesoporous inorganic materials, as media for biophysical studies of transmembrane proteins ("cubic lipidic phases"), as therapeutic nucleic acid delivery vehicles, and as ion transporting media for advanced fuel cells and batteries. LLCs arise from the concentration-dependent supramolecular self-assembly of small molecule surfactants in water to form nanostructured materials with structurally periodic aqueous and hydrophobic domains ranging in size from approximately 10-100 Å. Bicontinuous LLCs are especially coveted for their interpenetrating aqueous and hydrophobic nanodomains with tunable nanopore diameters (approximately 7-50 Å) lined with well-defined pore wall functionalities that percolate over macroscopic distances. These specific attributes render them useful as potential separations membrane materials.

In U.S. Pat. No. 8,834,743, a new family of anionic gemini surfactants and LLCs formed from the anionic gemini surfactants and a solvent were described. The anionic gemini surfactants readily form bicontinuous LLC phases. In U.S. Publication No. 2013/0190417, polymerizable analogs of the anionic gemini surfactants and their self-assembly into LLCs as well as crosslinked membrane forms were described. While the LLCs formed from the polymerizable anionic gemini surfactants are well-suited for their intended purpose, a disadvantage is the chemical synthesis process which can require multiple steps and can take up to several days to produce a large scale amount of surfactant from which the LLC is derived. What are needed are improved methods of making polymerizable LLCs and the LLC membranes produced using these methods.

SUMMARY

In an aspect, a polymerizable mixture comprises a functionalized ionic gemini surfactant having the structure (Ia), (Ib-1), (Ib-2), (Ic), (Id-1), or (Id-2):

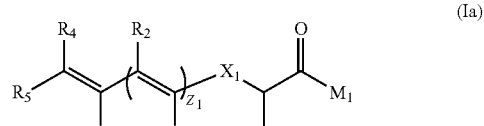

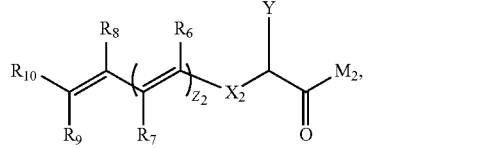

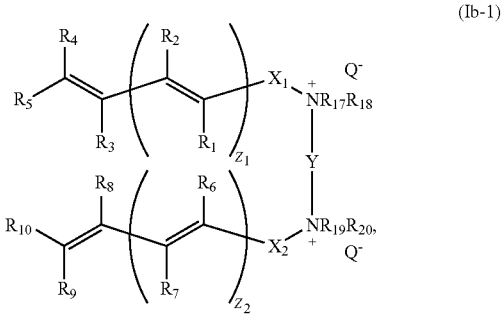

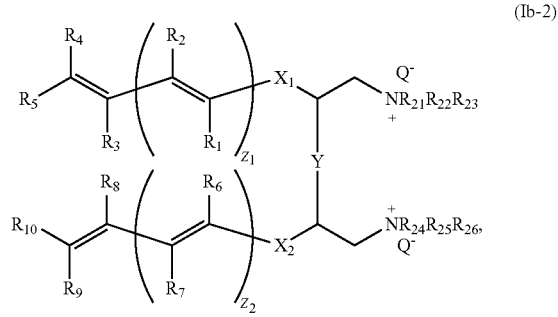

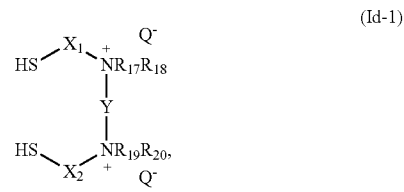

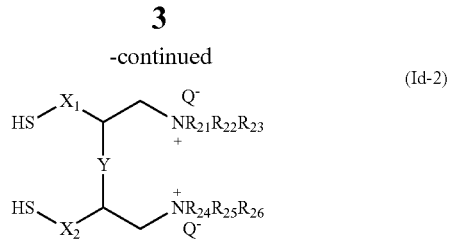

(Id-2)

wherein $X_1$ and $X_2$ are each independently an optionally substituted branched, unbranched, or cyclic aliphatic groups having from four to 30 carbon atoms, with the proviso that the $X_1$ and $X_2$ of structures (Ic), (Id-1), and (Id-2) do not contain an ene group;

$Z_1$ and $Z_2$ are integers, each independently having a value of zero, one, two, or three;

Y is a covalently-bound divalent linker;

$M_1$ and $M_2$ are the same or different and are each independently selected from hydrogen, —O$^-$(M$^+$), —OR$_{11}$, —O(C$_1$-C$_8$ alkyl)N(CH$_3$)$_3^+$(X$^-$), —(C$_0$-C$_8$ alkyl)NR$_{11}$R$_{12}$, —O(C$_1$-C$_8$ alkyl)NR$_{11}$R$_{12}$, —NH(C$_1$-C$_8$ alkyl)NR$_{11}$R$_{12}$, —NH(CH—R$_{13}$)COOM$^+$, —NR$_{11}$R$_{14}$, —OCH$_2$CH(OH)CH$_2$OH, —NH(C$_1$-C$_8$ alkyl)SO$_3^-$M$^+$, —N(CH$_3$)(C$_1$-C$_8$ alkyl)SO$_3$M$^+$, —NH(C$_1$-C$_8$ alkyl)OSO$_3^-$M$^+$, —N(CH$_3$)(C$_1$-C$_8$ alkyl)OSO$_3^-$M$^+$, —(C$_1$-C$_8$ alkyl)SO$_3^-$M$^+$, —O(C$_1$-C$_8$ alkyl)SO$_3^-$M$^+$, —(C$_1$-C$_8$ alkyl)OSO$_3^-$M$^+$, —O(C$_1$-C$_8$ alkyl)OSO$_3^-$M$^+$, —NH(C$_1$-C$_8$ alkyl)PO$_3$M$^+_2$, N(CH$_3$)(C$_1$-C$_5$ alkyl)PO$_3$M$^+_2$, —(C$_1$-C$_8$ alkyl)PO$_3$M$^+$2, or —O(C$_1$-C$_8$ alkyl)PO$_3$M$^+_2$ wherein M$^+$ is a counterion, X$^-$ is a counterion, $R_{11}$, $R_{12}$, and $R_{14}$ are independently chosen from hydrogen and optionally substituted C$_1$-C$_8$ alkyl, and $R_{13}$ is an amino acid side chain; and $R_1$ through $R_{10}$ are each independently chosen from hydrogen, fluoride, chloride, bromide, C$_1$-C$_8$ alkyl, C$_2$-C$_8$ alkenyl, tri(C$_1$-C$_4$ alkyl)silyl, and substituted or unsubstituted phenyl;

$R_{17}$ through $R_{20}$ and $R_{21}$ through $R_{26}$ are each independently selected from C$_1$ to C$_3$ alkyl; and Q is a counterion;

a thiol-ene crosslinking agent, wherein the thiol-ene crosslinking agent comprises two or more thiol groups when the functionalized ionic gemini surfactant is structure (Ia), (Ib-1), or (Ib-2), and the thiol-ene crosslinking agent comprises two or more ene groups when the functionalized ionic gemini surfactant is structure (Ic), (Id-1), or (Id-2); and optionally a polar solvent, or optionally a polar solvent with a co-solvent.

In another aspect, a polymer can be prepared from the polymerizable mixture referred to above by crosslinking the functionalized ionic gemini surfactant with the thiol-ene crosslinking agent.

In yet another aspect, a method of preparing a polymer comprises forming a polymerizable mixture comprising a functionalized ionic gemini surfactant and a thiol-ene crosslinking agent; and crosslinking the functionalized ionic gemini surfactant with the thiol-ene crosslinking agent to form the polymer; wherein the functionalized ionic gemini surfactant has the structure (Ia), (Ib-1), (Ib-2), (Ic), (Id-1), or (Id-2) as described above.

In still yet another aspect, a lyotropic liquid crystal composition comprises a functionalized ionic gemini surfactant having the structure (Ia), (Ib-1), (Ib-2), (Ic), (Id-1), or (Id-2) as described above, and a polar solvent. In another embodiment, the lyotropic liquid crystal composition is in the form of a polymer formed by crosslinking the functionalized ionic gemini surfactant with the thiol-ene crosslinking agent.

BRIEF DESCRIPTION OF THE DRAWINGS

FIGS. 2A and 2B show azimuthally-integrated SAXS patterns of (2A) NMe$_4$-83u/TMTMP/DMPAP/water bulk gels and (2B) NMe$_4$-83u/water LLCs. The stacked plots show samples prepared with varying water contents. The morphologies assigned from peak positions at each concentration are consistent between the two systems. At 50 and 60 wt % water, hexagonally packed cylinders form, whilst at 20-40 wt % water, double gyroid morphology is obtained.

FIG. 3 shows azimuthally-integrated SAXS patterns of NMe$_4$-83u/TMTMP/DMPAP/water gels containing 30 wt % water before and after crosslinking photopolymerization. The peaks marked in the top two plots are assigned to the (211), (220), (321), (400), (420), (332) and (422) Bragg reflections, which are the characteristic Miller indices associated with the double gyroid LLC morphology.

The above-described and other features will be appreciated and understood by those skilled in the art from the following detailed description, drawings, and appended claims.

DETAILED DESCRIPTION

The present disclosure is directed to polymerizable mixtures comprising a functionalized ionic gemini surfactant and a thiol-ene crosslinking agent; the polymerizable mixture optionally further comprising a polymerization initiator, a solvent such as a polar solvent and/or a hydrocarbon solvent, or any combination thereof. The functionalized ionic gemini surfactants present in the polymerizable mixtures comprising a solvent can form lyotropic liquid crystals while in the presence of the thiol-ene crosslinking agent. Upon crosslinking the functionalized ionic gemini surfactant with the thiol-ene crosslinking agent, it was surprisingly found that there is substantial retention of the lyotropic liquid crystal phase.

Figure 1A:
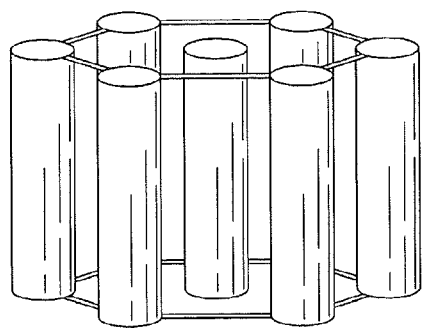
FIGS. 1A through 1F are illustrations of the observed LLC morphologies formed by gemini surfactants: hexagonal (H$_I$) with constant positive mean curvature (FIG. 1A), lamellar (L$_α$) with flat interfaces (FIG. 1B), Double Gyroid network (G$_I$) (FIG. 1C), Double Diamond network (D$_I$) (FIG. 1D), Primitive network (P$_I$) (FIG. 1E), and tetracontinuous hexagonal network (FIG. 1F) that require substantial positive and negative deviations from constant mean curvature.
Figure 1B:
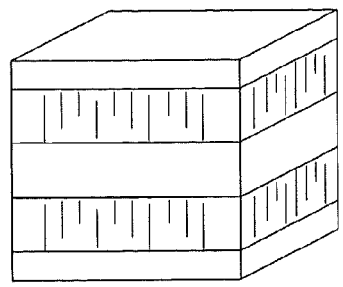
Figure 1C:
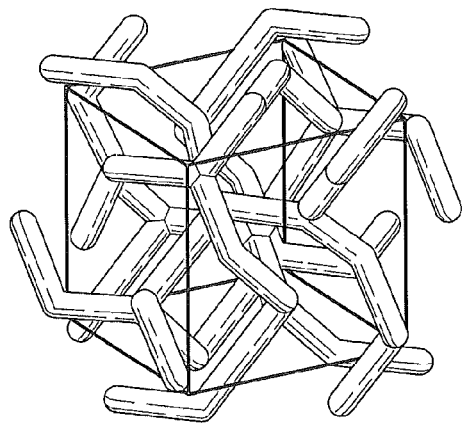
Figure 1D:
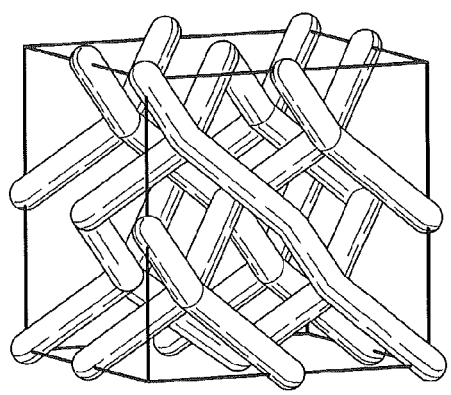
Figure 1E:
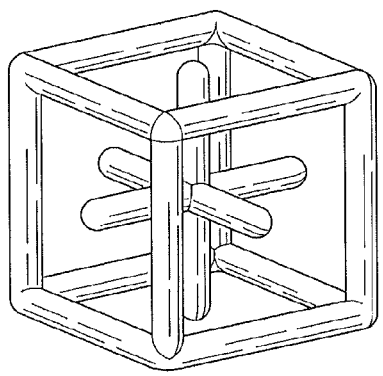
Figure 1F:
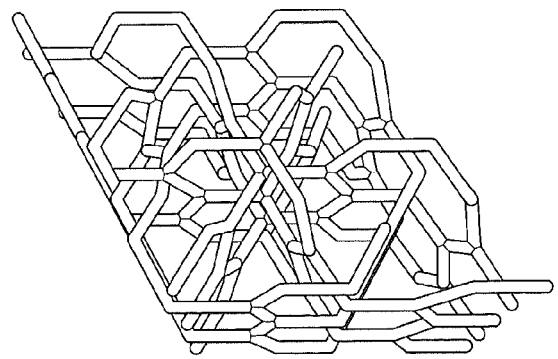

Lyotropic liquid crystals (LLCs) comprise materials that form phases having long-range translational order induced by the addition of a solvent. Stated another way, lyotropic liquid crystals comprise ordered phases in solvent, in which the structurally periodic phase that exists in the liquid crystal composition varies as a function of concentration of the surfactant in the solvent system, temperature, and pressure. A subset of these phases can be described as being triply periodic, since the phases comprise structures that repeat in three dimensions. LLC phases may be described in a phase diagram in which the X-axis (abscissa) is concentration and the Y-axis (ordinate) is temperature. The liquid crystalline phase that generally forms at low surfactant concentrations is the 'micellar' or 'discontinuous' phase comprising spherical micelles and which may be denoted by the symbol $I_1$. This is a viscous, optically non-birefringent phase in which the micelles are arranged on a cubic lattice. At higher concentrations, in general, the cylindrical micelles of indefinite length form and are arranged on a two-dimensional hexagonal lattice with long-range periodic order. This lyotropic liquid crystalline phase is known as the 'hexagonal phase' or 'hexagonally-packed cylinders phase,' or more specifically the "normal" hexagonal phase and is generally denoted by the symbol $H_1$. At higher concentrations, the 'lamellar phase' generally forms. This phase is denoted by the symbol $L_\alpha$. This phase consists of surfactant molecules arranged in bilayer sheets separated by layers of water. Some materials may form intermediate phases at concentrations generally between those concentrations at which hexagonal and lamellar phases form. Some intermediate phases may be referred to as bicontinuous cubic phases or Q-phases. Bicontinuous cubic phases include the double gyroid phase ($G_1$, space group #230), the single gyroid phase (space group #214), the double diamond phase (space group #224), and the primitive cubic phase (space group #229). See FIGS. 1A through 1F. FIG. 1F depicts a tetracontinuous hexagonal network phase, which may be prepared using ionic gemini surfactants of the present invention. The various phases that a lyotropic liquid crystal may assume are generally discussed as a function of concentration; however, phase transitions may occur as the temperature or pressure of the system increases. Surfactant concentrations at which a double gyroid phase, for example, may form at lower temperatures, e.g., 20° C., may shift or the range may narrow as the temperature of the system increases, e.g., to 100° C. The sensitivity of LLC phases to temperature, concentration, pressure, and added solvents limits their applications as new molecular separations media and in drug delivery. Thus, more robust LLC materials are required and may be obtained by permanently covalently crosslinking the LLC structure.

In an embodiment, a method of forming an LLC comprises preparing a polymerizable mixture comprising a functionalized ionic gemini surfactant, a thiol-ene crosslinking agent, and an optional polymerization initiator; adding a solvent, e.g., a polar solvent, to the polymerizable mixture; and allowing the LLC to form. In a further embodiment, after formation of the LLC, the functionalized ionic gemini surfactant is allowed to crosslink with the thiol-ene crosslinking agent, e.g., promoted with UV light or heat, to result in a polymer which substantially retains the lyotropic phase morphology. In one embodiment, after formation of the polymer, the added solvent may be removed.

The functionalized ionic gemini surfactants in the mixture with the thiol-ene crosslinking agent and a solvent form three-dimensional multiply continuous lyotropic phases over broad ranges of concentration and temperature. These three dimensional multiply continuous phases encompass bicontinuous cubic phases known in the art, for example, the double gyroid phase (space group #230), single gyroid (space group #214), double diamond phase (space group #224), or primitive cubic phase (space group #229). The three dimensional multiply continuous phases of the present disclosure additionally encompass tetracontinuous phases, such as a novel hexagonal tetracontinuous phase with percolating pores in three dimensions. This phase is comprised of three distinct, interpenetrating, and unconnected hydrophobic networks each having $P6_3/mmc$ (space group #194) symmetry to yield an overall hydrophobic network structure with $P6_3/mcm$ symmetry (space group #193), in which the voids are filled with solvent.

The functionalized ionic gemini surfactants comprise multiple, specifically two, hydrophobic tail groups comprising a functional group capable of undergoing a thiol-ene reaction, the tail groups being linked via a covalently-bound divalent linker, to appropriate headgroups as described herein. The functional group capable of undergoing a thiol-ene reaction can either be an unsaturated group ("ene group") or a thiol group where choice of the corresponding thiol-ene crosslinking agent would contain two or more thiol groups or ene groups, respectively. It is understood that when the functionalized ionic gemini surfactant comprises thiol groups, it will not comprise ene groups. Likewise, when the functionalized ionic gemini surfactant comprises ene groups, it will not comprise thiol groups.

In an aspect, a general structure of a functionalized ionic gemini surfactant has the following structure wherein Y is a covalently-bound divalent linking group as defined herein, $X_1$ and $X_2$ are the tail groups as defined herein, $G_1$ and $G_2$ are the functional groups capable of undergoing a thiol-ene reaction and which are an unsaturated group ("ene groups") or a thiol group, and $J_1$ and $J_2$ are the headgroups:

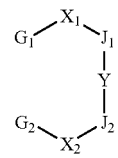

In an embodiment, the functionalized ionic gemini surfactant comprises an unsaturated group and has the following structures (Ia), (Ib-1), or (Ib-2)

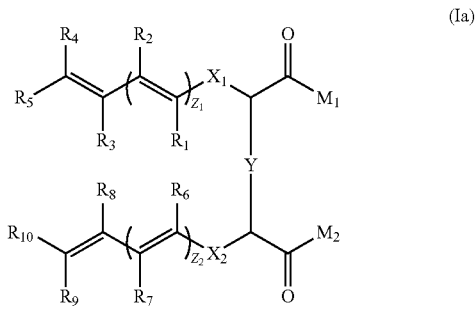

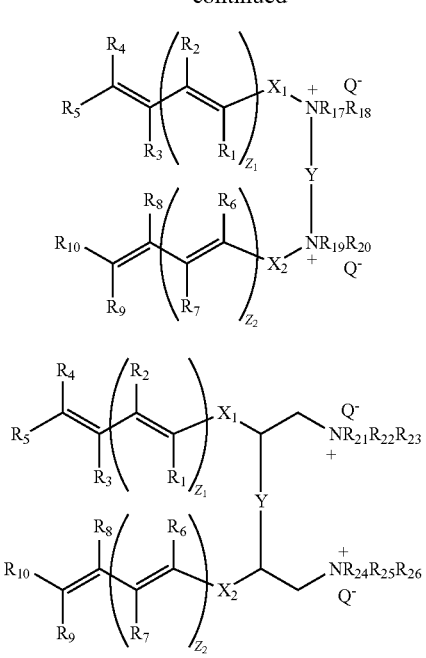

In another embodiment, the functionalized ionic gemini surfactant comprises a thiol group and has the following structures (Ic), (Id-1), or (Id-2)

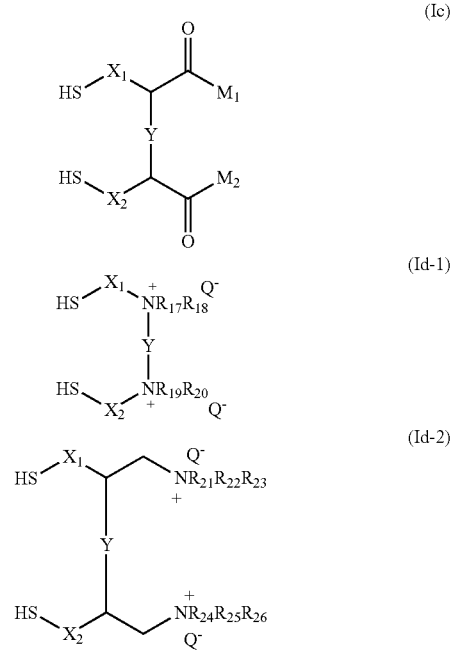

In structures (Ia), (Ib-1), (Ib-2), (Ic), (Id-1) and (Id-2), $X_1$ and $X_2$ are each independently an optionally substituted branched, unbranched, or cyclic aliphatic group having from four to 30 carbon atoms, specifically from four to 20 carbon atoms, even more specifically from four to 16 carbon atoms, such as from four to nine carbon atoms. The $X_1$ and $X_2$ aliphatic groups of structures (Ia), (Ib-1), and (Ib-2) may be saturated or may comprise unsaturated moieties, such as alkenyl or alkynyl. That is, the $X_1$ and $X_2$ aliphatic groups of structures (Ia), (Ib-1), and (Ib-2) may comprise one or more carbon-to-carbon double bonds and/or one or more carbon-to-carbon triple bonds. Additionally, the $X_1$ and $X_2$ aliphatic groups of structures (Ia), (Ib-1), (Ib-2), (Ic), (Id-1), and (Id-2) may comprise cyclic moieties, i.e., cycloalkyl, either within the main carbon chain or branched therefrom. The $X_1$ and $X_2$ of structures (Ia), (Ib-1), (Ib-2), (Ic), (Id-1), and (Id-2) aliphatic groups may comprise branching moieties, e.g., alkyl, alkenyl, trialkylsilyl, phenyl, and substituted phenyl. The $X_1$ and $X_2$ aliphatic groups of structures (Ia), (Ib-1), (Ib-2), (Ic), (Id-1), and (Id-2) may comprise hydrocarbyls (i.e., the entirety of the aliphatic group comprises only carbon-carbon or carbon-hydrogen bonds) or the aliphatic groups may comprise heteroatom substituents, such as halide atoms (e.g., fluorine, chlorine, and bromine) bonded to carbon atoms. In some embodiments, the aliphatic groups contain at least two fluoride atoms, such as at least four fluoride atoms. In some embodiments, the aliphatic groups are perfluorinated, meaning that all hydrogen atoms along the carbon chain are replaced with fluorine atoms.

In some embodiments, for structures (Ia), (Ib-1), and (Ib-2) the $X_1$ and $X_2$ aliphatic and aryl-aliphatic moieties comprise at least one carbon-to-carbon double bond. In some embodiments, for structures (Ia), (Ib-1), and (Ib-2) each of the $X_1$ and $X_2$ aliphatic and aryl-aliphatic moieties comprise at least two carbon-to-carbon double bonds. In some embodiments, the multiple carbon-to-carbon double bonds may be conjugated alkenes. In some embodiments, the multiple carbon-to-carbon double bonds may be non-conjugated, for example, separated by at least one intervening methylene. Gemini surfactants comprising long, saturated aliphatic chains tend to have a high degree of crystallinity, which may reduce the concentration and temperature ranges over which the surfactants form three dimensional multiply continuous phases. Double bonded moieties placed centrally within the long aliphatic chains advantageously disrupt the crystal-forming tendencies of surfactants, thereby extending the three dimensional multiply continuous phase concentration and temperature range.

In a specific embodiment, $X_1$ and $X_2$ are both $C_2$ to $C_{20}$ alkyl, specifically $C_2$ to $C_{10}$ alkyl, and more specifically $C_4$-$C_7$ alkyl, any of $C_4$, $C_5$, $C_6$, or $C_7$ alkyl.

In structures (Ia), (Ib-1), and (Ib-2), $Z_1$ and $Z_2$ are integers, each independently having a value of zero, one, two, or three. In specific embodiments of the present disclosure, $Z_1$ and $Z_2$ are each independently zero or one. In some embodiments of the present disclosure, $Z_1$ and $Z_2$ are both one.

In structures (Ia), (Ib-1), and (Ib-2), $R_1$ through $R_{10}$ are each independently selected from the group consisting of hydrogen, fluoride, chloride, bromide, $C_1$ to $C_8$ alkyl, $C_2$ to $C_8$ alkenyl, tri($C_1$-$C_4$ alkyl)silyl, and substituted or unsubstituted phenyl. In one embodiment, the alkyl and alkenyl moieties have 1 to 4 carbon atoms. Trialkylsilyl has the general structure $R_3Si$, wherein the R is selected from methyl, ethyl, propyl, isopropyl, butyl, sec-butyl, tert-butyl, and combinations thereof. In some embodiments, each of $R_1$ through $R_{10}$ is independently chosen from hydrogen and halogen. In certain embodiments each of $R_1$ through $R_{10}$ is hydrogen. In embodiments wherein the $X_1$ and $X_2$ aliphatic moieties are perfluorinated, each of $R_1$ through $R_{10}$ is fluoride. In structures (Ib-1), (Ib-2), (Id-1) and (Id-2) $R_{17}$ through $R_{20}$ and $R_{21}$ through $R_{26}$ are each independently selected from $C_1$ to $C_3$ alkyl (e.g. methyl, ethyl, n-propyl, isopropyl).

In structures (Ia), (Ib-1), (Ib-2), (Ic), (Id-1) and (Id-2), Y is a linking group such as a covalently bound divalent linker. In some embodiments, Y comprises an optionally substituted $C_1$-$C_{20}$ aliphatic group, an optionally substituted $C_1$-$C_{20}$ heteroaliphatic group, which aliphatic and heteroaliphatic groups may be branched, unbranched, or cyclic.

When Y is an aliphatic group it comprises a group of three carbon atoms to 20 carbon atoms, such as a group of three carbon atoms to 8 carbon atoms. An "aliphatic group" is a saturated or unsaturated hydrocarbon group such as an alkyl, alkenyl or alkynyl group, or a non-aromatic cyclic group, such as a cyclohexane, or may contain both a non-aromatic cyclic group and an acyclic hydrocarbon chain. A "heteroaliphatic group" is an aliphatic group in which one or more carbons in the aliphatic group has been replaced with a heteroatom independently chosen from N, O, S, and P. In some embodiments, Y comprises heteroatoms, such as oxygen, that increase the hydrophilicity of the covalently bound divalent linker, Y. Heteroaliphatic linkers may increase hydrophilicity or alter linker conformations to enable formation of triply periodic multiply continuous phases with different stabilities. The aliphatic or heteroaliphatic group may be substituted with substituents such as, but not limited to, halogen, hydroxyl, amino, cyano, —CHO, —COOH, alkoxy, alkanoyl, aminoalkyl, alkylcarboxamide, and alkylester.

In some specific embodiments, Y comprises an unsubstituted branched or unbranched aliphatic group comprising three to 20 carbon atoms, such as three to 12 carbon atoms, or three to eight carbon atoms. Aliphatic linkers, including acyclic aliphatic linkers provide a large degree of flexibility to the connection. Flexible hydrophobic spacers enable the surfactant to accommodate the substantial deviations from constant mean interfacial curvature required for triply periodic multiply continuous phase stabilization.

In some embodiments, Y comprises an aryl or heteroaryl group, comprising one aromatic ring or a bi- or tri-cyclic fused rings system of which at least one ring is aromatic, wherein each aromatic ring in the aryl or heteroaryl group contains 5-6 ring atoms, with 0-4 heteroatoms independently chosen from N, O, and S with remaining ring atoms being carbon, and each non-aromatic ring in the aryl or heteroaryl group contain 3-7 ring atoms with 0 to 2 heteroatoms independently chosen from N, O, and S and remaining ring atoms being carbon, and wherein the aryl or heteroaryl group optionally comprises one or two $C_1$-$C_5$ aliphatic chains wherein the point of attachment of Y is a carbon in the $C_1$-$C_5$ aliphatic chain. Rigid hydrophobic spacers alter conformational flexibility that enables formation of triply periodic multiply continuous phases with different stabilities. Aryl group substituents include fluoride, chloride, bromide, methyl, ethyl, propyl, butyl hydroxyl, alkoxy generally having from one to four carbon atoms, nitro, and amines having the general structure —$NH_xR$— wherein x has a value from 0 to 2, and R may be an alkyl having from one to four carbon atoms. A heteroaryl group may be for example a pyridyl, pyrazolyl, furanyl pyrrolyl, thienyl, or imidazolyl group. The aliphatic chains extending from the aryl moiety generally have 0 to five carbon atoms, one to five carbon atoms, or one to three carbon atoms. The aliphatic chains may be located ortho, meta, or para to each other around the aromatic ring. In some embodiments, such a linking group has the structure:

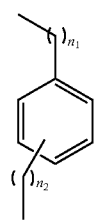

wherein $n_1$ and $n_2$ are integers, each having an independent value of 0 to five, one to five, or one to three. The aliphatic chains herein may be located ortho, meta, or para to each other around the aromatic ring.

In some embodiments, the hydrophilic linking group comprises a polyalkylether moiety, for example, a short polyethylene oxide or polypropylene oxide, generally having 1 to 4 repeat units.

In one embodiment, the linking group is a poly($C_1$-$C_3$) alkylether moiety having 1 to 4 repeating units. In one embodiment, the hydrophilic moiety has the structure:

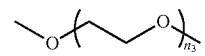

wherein $n_3$ is an integer having a value of one to four, such as one or two. This group may be optionally substituted.

In some embodiments, the hydrophilic linking group contains hydroxyl or alkoxy substituents. Such a connecting moiety may have the structure:

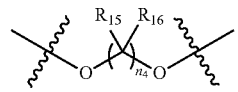

wherein $R_{15}$ and $R_{16}$ are each independently hydrogen, hydroxyl, alkyl or alkoxy having from one to five carbon atoms; and $n_4$ is an integer having a value of one to ten, such as one to six, or one to three. One such hydrophilic moiety has the structure:

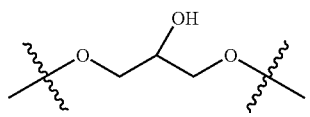 [SMILES: *OCC(O)CO*]

In further embodiments, linking group Y is

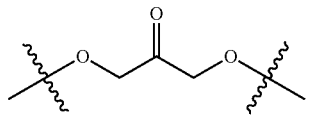 [SMILES: *OCC(=O)CO*]

or

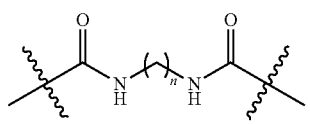

n = 1-10.

n=1-10.

In an embodiment, Y is a covalently bound, divalent linker chosen from i) an optionally substituted $C_1$-$C_{20}$ aliphatic group, an optionally substituted $C_1$-$C_{20}$ heteroaliphatic group, which aliphatic and heteroaliphatic groups may be branched, unbranched, or cyclic; ii) an optionally substituted aryl or heteroaryl group, comprising 1 aromatic ring or 2 or 3 fused rings of which at least one ring is aromatic, wherein each aromatic ring in the aryl or heteroaryl group contains 5-6 ring atoms, with 0-4 heteroatoms independently chosen from N, O, and S with remaining ring atoms being carbon, and each non-aromatic ring in the aryl or heteroaryl group contain 3-7 ring atoms with 0 to 2 heteroatoms independently chosen from N, O, and S and remaining ring atoms being carbon, and wherein the aryl or heteroaryl group optionally comprises one or two $C_1$-$C_5$ aliphatic chains wherein the point of attachment of Y is a carbon in the $C_1$-$C_5$ aliphatic chain; and iii) an optionally substituted poly($C_1$-$C_{10}$ alkyl)ether of the formula —$C_0$-$C_3$ alkyl-(O—$C_1$-$C_{10}$ alkyl)$_n$-O—$C_0$-$C_3$ alkyl, specifically —$C_1$-$C_3$ alkyl-(O—$C_1$-$C_{10}$ alkyl)$_n$-O—$C_1$-$C_3$ alkyl, or an optionally substituted poly($C_1$-$C_{10}$ alkylcarboxamide) of the formula —$C_0$-$C_3$ alkyl-((C=O)NH—$C_1$-$C_{10}$ alkyl)$_n$-(C=O)NH—$C_1$-$C_3$ alkyl, specifically —$C_1$-$C_3$ alkyl-((C=O)NH—$C_1$-$C_{10}$ alkyl)$_n$-(C=O)NH—$C_1$-$C_3$ alkyl, where n is an integer from 0 to 4. In an embodiment, Y is a divalent poly($C_1$-$C_3$ alkyl)ether of the formula —$C_0$-$C_3$ alkyl-(O—$C_1$-$C_3$ alkyl)$_n$-O—$C_0$-$C_3$ alkyl or —$C_1$-$C_3$ alkyl-(O—$C_1$-$C_3$ alkyl)$_n$-O—$C_1$-$C_3$ alkyl, where n is an integer from 0 to 4, which is optionally substituted with one or more substituents independently chosen from hydroxy, oxo, $C_1$-$C_3$ alkyl, and $C_1$-$C_3$ alkoxy.

In structures (Ia) and (Ic), $M_1$ and $M_2$ are each independently a group —$O^-(M^+)$, where $M^+$ is a counterion, or another covalently bonded group as described herein. Without being held to theory, it is believed that the counterion in the polymerizable ionic carboxylate gemini surfactants of the present disclosure, when present, also plays a role in modifying the flexibility and the preferred molecular conformations of the surfactant. Highly dissociated counterions favor surfactant conformations in which tails splay to mitigate intramolecular Coulombic repulsions between headgroups, which ultimately manifests in supramolecular packings with non-constant mean curvature. Exemplary $M^+$ counterions include lithium ion; sodium ion; potassium ion; zinc ion; cesium ion; magnesium ion; calcium ion; ammonium ion; alkylammonium ion having the structure $H_xR_{4-x}N^+$ wherein x is an integer having a value of 0 through 4 and R is selected from the group consisting of methyl, ethyl, propyl, isopropyl, butyl, sec-butyl, tert-butyl and combinations thereof; tetrakis(hydroxymethyl)phosphonium ion; tetramethylphosphonium ion; choline; imidazolium; bis(quaternary ammonium) ion, and combinations thereof. Alkylammonium ions may include, for example, methylammonium ion, dimethylammonium ion, trimethylammonium ion, ethylammonium ion, diethylammonium ion, triethylammonium ion, tetramethylammonium ion, trimethylethylammonium, tetraethylammonium ion, triethylmethylammonium, and choline ion. Specific $M^+$ counterions include sodium ion, potassium ion, and tetramethylammonium ion.

In some embodiments of structure (Ia) and (Ic), $M_1$ and $M_2$ are each independently a covalently bonded group, such as hydrogen, hydroxyl, an optionally substituted alkyl group, an optionally substituted alkoxy group, an optionally substituted mono- or di-alkylamino group, or an optionally substituted (mono- or di-alkylamino)alkyl group. Particular $M_1$ and $M_2$ groups include —NH(CH—$R_{13}$)COO$^-M^+$, in which $R_{13}$ is an amino acid side chain and —NH($C_1$-$C_8$ alkyl)SO$_3^-M^+$. In some embodiments, $M_1$ or $M_2$ are each independently an aliphatic group, e.g., an alkyl group, having one to eight carbon atoms, or one to four carbon atoms, such as methyl, ethyl, isopropyl, n-propyl, isobutyl, n-butyl, or sec-butyl. In some embodiments, $M_1$ or $M_2$ is methyl. In some embodiments, $M_1$ and $M_2$ are the same or different and are each independently —$O^-(M^+)$ where $M^+$ is a counterion, or a $M_1$ and $M_2$ are a covalently bonded group selected from —($C_1$-$C_8$ alkyl)NR$_{11}$R$_{12}$, —NH(CH—$R_{13}$)COO$^-M^+$, —NH($C_1$-$C_8$ alkyl)SO$_3^-M^+$, or —OR$_{11}$ wherein R$_{11}$ and R$_{12}$ are independently chosen from hydrogen and optionally substituted $C_1$-$C_8$ alkyl, and R$_{13}$ is an amino acid side chain. In specific embodiments, $M^+$ is selected from the group consisting of protons, sodium ions, potassium ions, and tetramethylammonium ions. In more specific embodiments, $M_1$ and $M_2$ are independently selected from the group consisting of hydroxyl, methoxy, —O$^-$Na$^+$, and —O$^-$K$^+$.

In some embodiments of structure (Ia) and (Ic) $M_1$ and $M_2$ are each independently —$O^-(M^+)$ where $M^+$ is a counterion, or $M_1$ and $M_2$ are each independently (i) —O($C_1$-$C_8$ alkyl)N(CH$_3$)$_3^+$(X$^-$) where X$^-$ is a counterion, —($C_0$-$C_8$ alkyl)NR$_{11}$R$_{12}$, —O($C_1$-$C_8$ alkyl)NR$_{11}$R$_{12}$, —NH($C_1$-$C_8$ alkyl)NR$_{11}$R$_{12}$, —NH(CH—R$_{13}$)COOH, —OR$_{11}$, —NR$_{11}$R$_{14}$, and —O$^-$(M$^+$) where M$^+$ is a counterion, wherein R$_{11}$, R$_{12}$, and R$_{14}$ are independently chosen from hydrogen and optionally substituted $C_1$-$C_8$ alkyl, and wherein R$_{13}$ is an amino acid side chain; or (ii) —OCH$_2$CH(OH)CH$_2$OH, —NH($C_1$-$C_8$ alkyl)SO$_3$H, —N(CH$_3$)($C_1$-$C_8$ alkyl)SO$_3$H, —O($C_1$-$C_8$ alkyl)SO$_3$H, —NH($C_1$-$C_8$ alkyl)OSO$_3^-$M$^+$, —N(CH$_3$)($C_1$-$C_8$ alkyl)OSO$_3^-$M$^+$, —O($C_1$-$C_8$ alkyl)OSO$_3^-$M$^+$, —NH($C_1$-$C_8$ alkyl)PO$_3$M$^+_2$, —N(CH$_3$)($C_1$-$C_8$ alkyl)PO$_3$M$^+_2$, or —O($C_1$-$C_8$ alkyl)PO$_3$M$^+_2$.

The Q in structures (Ib-1), (Ib-2), (Id-1), and (Id-2) is a counterion and is, for example, bromide, chloride, fluoride, iodide, phosphate, hydrogen phosphate, dihydrogen phosphate, sulfate, hydrogen sulfate, acetate, chloroacetate, dichloroacetate, trichloroacetate, fluoroacetate, difluoroacetate, trifluoroacetate, methanesulfonate, trifluoromethanesulfonate, succinate and the like.

In some embodiments of the present disclosure, the anionic gemini surfactant has the following structure (IIa):

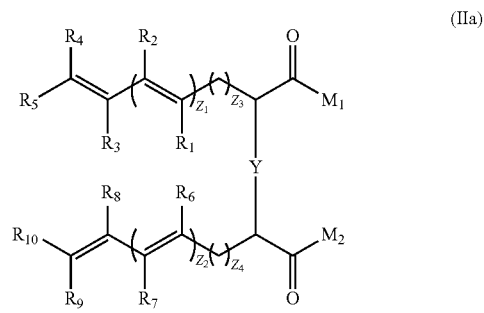

(IIa)

In structure (IIa), $Z_3$ and $Z_4$ are integers, each independently having a value of four to twenty; specifically four to twelve, such as seven to eleven, such as seven. Y, $M_1$, $M_2$, $Z_1$, $Z_2$, and $R_1$-$R_{10}$ are as defined above in connection with structure (Ia).

In some embodiments of the present disclosure, the cationic gemini surfactant has the following structure (IIb-1):

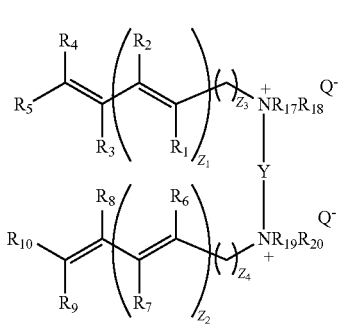

(IIb-1)

In structure (IIb-1), $Z_3$ and $Z_4$ are integers, each independently having a value of four to twenty; specifically four to twelve, such as seven to eleven, such as seven. Y, Q, $Z_1$, $Z_2$, and $R_1$-$R_{10}$ and $R_{17}$-$R_{20}$ are as defined above in connection with structure (Ib-1).

In some embodiments of the present disclosure, the cationic gemini surfactant has the following structure (IIb-2):

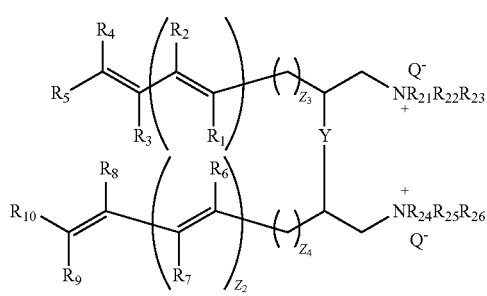

(IIb-2)

In structure (IIb-2), $Z_3$ and $Z_4$ are integers, each independently having a value of four to twenty; specifically four to twelve, such as seven to eleven, such as seven. Y, Q, $Z_1$, $Z_2$, $R_1$-$R_{10}$ and $R_{21}$-$R_{26}$ are as defined above in connection with structure (Ib-2).

In some embodiments of the present disclosure, the anionic gemini surfactant has the following structure (IIc):

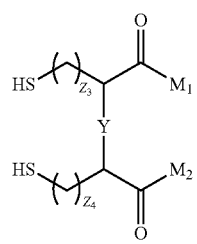

(IIc)

In structure (IIc), $Z_3$ and $Z_4$ are integers, each independently having a value of four to twenty; specifically four to twelve, such as seven to eleven, such as seven. Y, $M_1$, and $M_2$, are as defined above in connection with structure (Ic).

In some embodiments of the present disclosure, the cationic gemini surfactant has the following structure (IId-1):

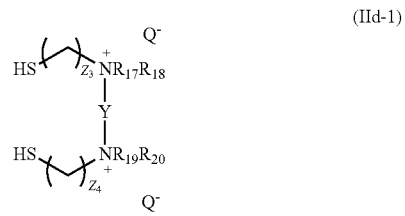

(IId-1)

In structure (IId-1), $Z_3$ and $Z_4$ are integers, each independently having a value of four to twenty; specifically four to twelve, such as seven to eleven, such as seven. Y, Q and $R_{17}$-$R_{20}$ are as defined above in connection with structure (Id-1).

In some embodiments of the present disclosure, the cationic gemini surfactant has the following structure (IId-2):

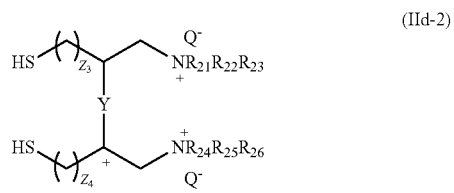

(IId-2)

In structure (IId-2), $Z_3$ and $Z_4$ are integers, each independently having a value of four to twenty; specifically four to twelve, such as seven to eleven, such as seven. Y, Q, and $R_{21}$-$R_{26}$ are as defined above in connection with structure (Id-2).

In some embodiments, the anionic gemini surfactant has the following structure (IIIa):

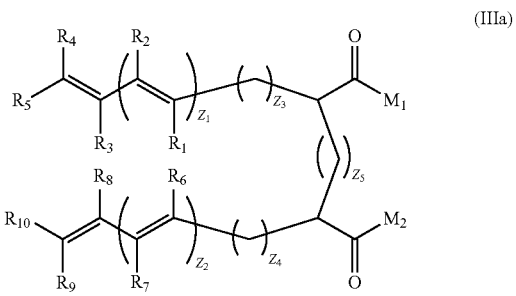

(IIIa)

In structure (IIIa), $Z_3$ and $Z_4$ are integers, each independently having a value of four to twenty; specifically four to twelve, such as seven to eleven, such as seven. $Z_5$ is an integer having a value of two to twelve, specifically two to eight. $M_1$, $M_2$, $Z_1$, $Z_2$, and $R_1$-$R_{10}$ are as defined above in connection with structure (Ia).

In an embodiment, the functionalized anionic gemini surfactant has the structure (IIIa) wherein $Z_5$ is two, three, or four, specifically three; $Z_3$ and $Z_4$ are each six, seven, or eight, specifically seven; $Z_1$ and $Z_2$ are each zero; $R_3$-$R_5$ and $R_8$-$R_{10}$ are all hydrogen; and $M_1$ and $M_2$ are each —O⁻(M⁺) where M⁺ is a counterion as defined above.

In some embodiments, the functionalized cationic gemini surfactant has the following structure (IIIb-1):

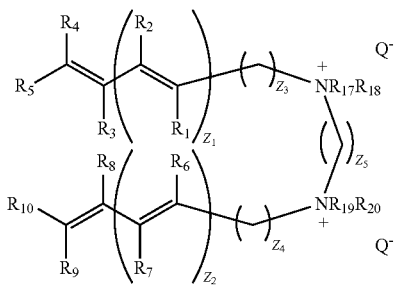

(IIIb-1)

In structure (IIIb-1), $Z_3$ and $Z_4$ are integers, each independently having a value of four to twenty; specifically four to twelve, such as seven to eleven, such as seven. $Z_5$ is an integer having a value of two to twelve, specifically two to eight. Q, $Z_1$, $Z_2$, $R_1$-$R_{10}$ and $R_{17}$-$R_{20}$ are as defined above in connection with structure (Ib-1).

In an embodiment, the functionalized cationic gemini surfactant has the structure (IIIb-1) wherein $Z_5$ is two, three, or four, specifically three; $Z_3$ and $Z_4$ are each eight, nine, or ten, specifically nine; $Z_1$ and $Z_2$ are each zero; and $R_3$-$R_5$ and $R_8$-$R_{10}$ are all hydrogen; $Q^-$ is a counterion as defined above.

In some embodiments, the functionalized cationic gemini surfactant has the following structure (IIIb-2):

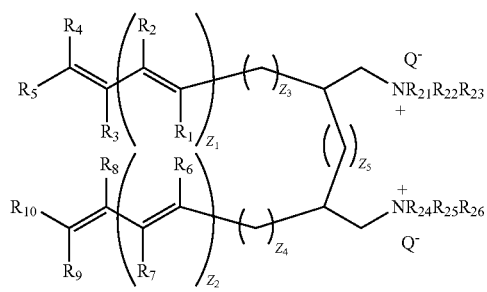

(IIIb-2)

In structure (IIIb-2), $Z_3$ and $Z_4$ are integers, each independently having a value of four to twenty; specifically four to twelve, such as seven to eleven, such as seven. $Z_5$ is an integer having a value of two to twelve, specifically two to eight. Q, $Z_1$, $Z_2$, $R_1$-$R_{10}$, and $R_{20}$-$R_{26}$ are as defined above in connection with structure (Ib-2).

In an embodiment, the functionalized cationic gemini surfactant has the structure (IIIb-2) wherein $Z_5$ is two, three, or four, specifically three; $Z_3$ and $Z_4$ are each eight, nine, or ten, specifically nine; $Z_1$ and $Z_2$ are each zero; and $R_3$-$R_5$ and $R_8$-$R_{10}$ are all hydrogen; $R_{21}$-$R_{26}$ are all methyl; and $Q^-$ is a counterion as defined above.

In some embodiments, the functionalized ionic gemini surfactant has the following structure (OOOc):

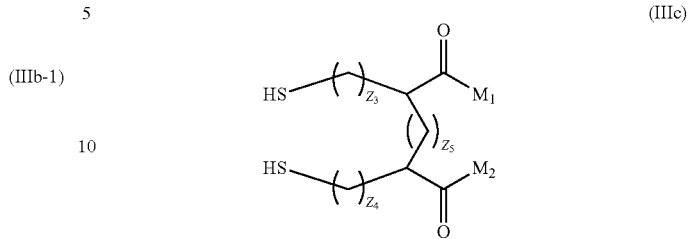

(IIIc)

In structure (IIIc), $Z_3$ and $Z_4$ are integers, each independently having a value of four to twenty; specifically of four to twelve, such as seven to eleven, such as seven. $Z_5$ is an integer having a value of two and twelve, specifically two to eight. $M_1$ and $M_2$ are as defined above in connection with structure (Ic).

In some embodiments, the functionalized cationic gemini surfactant has the following structure (IIId-1):

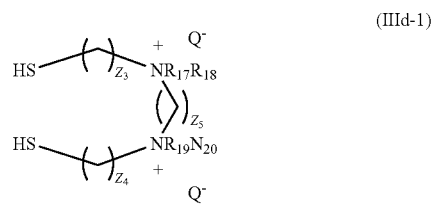

(IIId-1)

In structure (IIId-1), $Z_3$ and $Z_4$ are integers, each independently having a value of four and twenty; specifically four to twelve, such as seven to eleven, such as seven. $Z_5$ is an integer having a value of two and twelve, specifically two to eight. $R_{17}$-$R_{20}$ and Q are as defined above in connection with structure (Id-1).

In some embodiments, the functionalized cationic gemini surfactant has the following structure (IIId-2):

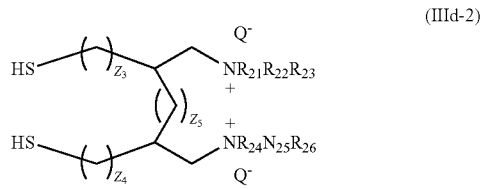

(IIId-2)

In structure (IIId-2), $Z_3$ and $Z_4$ are integers, each independently having a value of four and twenty; specifically four to twelve, such as seven to eleven, such as seven. $Z_5$ is an integer having a value of two and twelve, specifically two to eight. $R_{21}$-$R_{26}$ and Q are as defined above in connection with structure (Id-2).

The polymerizable mixture comprising the functionalized ionic gemini surfactant and thiol-ene crosslinking agent may further comprise a solvent, specifically a polar solvent. Exemplary polar solvents including polar, protic solvents are water, ethylene glycol, diethylene glycol, glycidol, 2-butene-1,4-diol, propanediol, glycerol, formamide, N-methylformamide, N-ethylformamide, acetamide, N-methylacetamide, N-ethylacetamide, methanol, ethanol, propanol, ethylammonium nitrate, ethanolammonium nitrate, ethyl ammonium formate, ethanolammonium formate, ethylammonium acetate, ethanolammonium acetate, 1-ethyl-3-methylimidazolium acetate, 1-ethyl-3-methylimidazolium bis(trifluoromethylsulfonyl)imide, 1-ethyl-3-methylimidazolium tetrafluoroborate, or any combination thereof. In an embodiment, the polar solvent is water.

The polymerizable mixture comprising the functionalized ionic gemini surfactant, thiol-ene crosslinking agent and a polar solvent may further comprise a co-solvent. Exemplary co-solvents are hexane, octane, decane, cyclohexane, decalin, benzene, toluene, m-xylene, o-xylene, p-xylene, naphthalene, decanol, cholesterol or any combination thereof.

The functionalized ionic gemini surfactants in the presence of the thiol-ene crosslinking agent and a polar solvent are capable of robustly forming a variety of lyotropic liquid crystal phases, the morphology of which is substantially retained after crosslinking the functionalized ionic gemini surfactant with the thiol-ene crosslinking agent. The polymerizable mixtures comprising functionalized ionic gemini surfactant, thiol-ene crosslinking agent and solvent are capable of forming triply periodic phases over a broad range of concentrations and temperatures. These triply periodic phases encompass bicontinuous cubic phases known in the art, for example, the double gyroid phase (space group #230), single gyroid phase (space group #214), double diamond phase (space group #224), or primitive cubic phase (space group #229). The triply periodic phases of the present disclosure additionally encompass tetracontinuous phases, such as a novel hexagonal tetracontinuous phase (space group #193) with percolating pores in three dimensions. The pores in these materials may range from 5-50 Å in diameter.

In some embodiments, the polymerizable mixture comprising functionalized ionic gemini surfactant, thiol-ene crosslinking agent and polar solvent forms a triply periodic phase such as a double gyroid phase (space group #230), single gyroid (space group #214), double diamond phase (space group #224), primitive cubic phase (space group #229), or hexagonal tetracontinuous phase over a range of polar solvent concentrations from $C_i$ to $C_{ii}$ wherein the difference between $C_i$ and $C_{ii}$ is at least 10 weight percent, at least 12 weight percent, at least 14 weight percent, at least 16 weight percent, at least 18 weight percent, or at least 20 weight percent. Advantageously, the triply periodic phase is stable over a broad range of temperatures from $T_i$ to $T_{ii}$ wherein the difference between $T_i$ and $T_{ii}$ is at least 40° C., at least 45° C., at least 50° C., at least 55° C., at least 60° C., at least 65° C., at least 70° C., at least 75° C., or at least 80° C.

The polymerizable mixture comprising functionalized ionic gemini surfactant, thiol-ene crosslinking agent and polar solvent can generally form a triply periodic phase at polar solvent concentrations of at least 40 weight percent, at least 45 weight percent, or at least 50 weight percent. At these polar solvent concentrations, the lyotropic liquid crystal phase generally transitions from hexagonal to Q-phase. At polar solvent concentrations generally no less than 10 weight percent, no less than 15 weight percent, or no less than 20 weight percent, the lyotropic liquid crystal phase generally transitions from Q-phase to lamellar. The concentrations at which these phase transitions occur depend upon multiple factors, in addition to concentration. These factors include the structure of the functionalized ionic gemini surfactant, the identity of the counterion, the temperature of the system, the pressure of the system, and the presence and identity of co-solvents, if any are added to the system. In view thereof, the concentrations of the phase transition may vary significantly from one surfactant to another. The functionalized ionic gemini surfactants comprising at least one, and specifically two, carboxylate groups advantageously provide robust LLC systems exhibiting triply periodic phases over broad concentration and temperature ranges. The functionalized ionic gemini surfactants may alternatively comprise at least one, and specifically two, alkylammonium groups.

In order to prepare a lyotropic liquid crystal, the solvent concentration is generally at least 5 weight percent, specifically at least 10 weight percent of the polymerizable mixture comprising a functionalized ionic gemini surfactant, thiol-ene crosslinking agent, and solvent. At concentrations less than about 5 weight percent or less than about 10 weight percent, the functionalized ionic gemini surfactant generally forms a crystalline phase. Suitable polar solvents include water, ethylene glycol, diethylene glycol, glycidol, 2-butene-1,4-diol, propanediol, glycerol, formamide, N-methylformamide, N,-ethylformamide, acetamide, N-methylacetamide, N-ethylacetamide, methanol, ethanol, propanol, ethylammonium nitrate, ethanolammonium nitrate, ethyl ammonium formate, ethanolammonium formate, ethylammonium acetate, and ethanolammonium acetate. In several embodiments, the solvent is water. In addition to a polar solvent, the polymerizable mixture may include a co-solvent, generally at a low concentration, such as less than 40 weight percent, specifically less than 30 weight percent of the total polymerizable mixture composition. In general, a co-solvent may exist in the solvent system when the gemini surfactant is pre-dissolved in a co-solvent, and the gemini surfactant is introduced into the polar solvent in a co-solvent solution. Co-solvents which may be used to pre-dissolve the gemini surfactants include methanol, ethanol, acetone, tetrahydrofuran, diethyl ether, benzene, glycerol, ethylene glycol, dimethylformamide, hexane, octane, decane, cyclohexane, decalin, benzene, toluene, m-xylene, naphthalene and decanol.

The thiol-ene crosslinking agent can be any crosslinking agent comprising two, three, four, or more functional groups capable of undergoing thiol-ene chemistry, i.e., thiol groups or unsaturated moieties ("ene groups"), such as alkenyl, alkynyl, allyl, acrylate, methacrylate, vinyl, and the like. It is understood that the thiol-ene crosslinking agent will only contain either ene groups or thiol groups, but not both.

The thiol-ene crosslinking agent comprises an aliphatic or aromatic central structure comprising two, three, four, or more functional groups capable of undergoing thiol-ene chemistry pendant from the central structure. When aliphatic, the central structure can be an optionally substituted branched, unbranched, or cyclic aliphatic group having from two to twenty carbon atoms, specifically from four to fifteen carbon atoms. The central structure may further comprise ether groups, ester groups, ketone groups, amide groups, thioether groups, silane groups, and the like.

Exemplary thiol functionalized crosslinking agents include trimethylolpropane tris(3-mercaptopropionate); pentaerythritol tetra-(3-mercaptopropionate); 2,2-bis((2-mercaptoacetoxy)methyl)propane-1,3-diyl bis(2-mercaptoacetate); 1,2-ethanedithiol; 1,4-butanedithiol; 1,6-hexanedithiol; dithiothreitol; 2,2-bis(mercaptomethyl)propane-1,3-dithiol; 2-(mercaptomethyl)-2-methylpropane-1,3-dithiol; glycol bis(3-mercaptopropionate); and the like, or a combination thereof.

The so-called "multifunctional thiols" disclosed in U.S. Pat. No. 8,440,736 (incorporated by reference herein) can be used as the thiol functionalized crosslinking agents. These thiols include several noted above as well as ethoxylated pentaerythritol tetra-(3-mercaptopropionate); polypropylene glycol 3-mercaptopropionate; ethoxylated trimethylpropane tri(3-mercaptopropionate); ethoxylated glycol dimercaptoacetate; 1,4-bis(3-mercaptobutylyloxy)butane; pentaerythrytol tetrakis (3-mercaptobutylate); and 1,3,5-Tris(3-mercaptobutyloxethyl)-1,3,5-triazine-2,4,6(1H,3H,5H)-trione; and the like, or a combination thereof.

Exemplary ene group functionalized crosslinking agent can be a pentaerythritol or 2-ethyl-2-(hydroxymethyl)propane-1,3-diol that is fully functionalized at the alcohol groups with a vinyl, allyl, acrylate, methacrylate, thioacrylate, thiomethacrylate, or similar ene group.

Exemplary ene group functionalized crosslinking agents include heptane-1,7-diyldiacrylate; hexane-1,6-diyl diacrylate; pentane-1,5-diyl diacrylate; butane-1,4-diyl diacrylate; 1,7-bis(vinyloxy)heptane; 1,6-bis(vinyloxy)hexane; 1,5-bis(vinyloxy)pentane; 1,4-bis(vinyloxy)butane; 1,7-bis(allyloxy)heptane; 1,6-bis(allyloxy)hexane; 1,5-bis(allyloxy)pentane; 1,4-bis(allyloxy)butane; 1-(allyloxy)-2,2-bis(allyloxymethyl)butane; 2-(acryloyloxymethyl)-2-ethylpropane-1,3-diyl diacrylate; and the like.

The molar ratio of functionalized ionic gemini surfactant to thiol-ene crosslinking agent can be 20:80 to 80:20, specifically 30:70 to 70:30, more specifically 40:60 to 60:40.

The polymerizable mixture may optionally further comprise a polymerization initiator. The polymerization initiator can be a photoinitiator, e.g., suitable for use with UV light, or a thermal initiator.

The polymerization initiator can be a photoinitiator. Exemplary photoinitiators include free radical photoinitiators such as substituted acetophenones, such as 2,2-dimethoxy-2-phenylacetophenone, 2,2-diethoxyacetophenone, 2-benzyl-2-(dimethylamino)-4'-morpholinobutyrophenone, 4'-tert-butyl-2',6'-dimethylacetophenone, diphenyl(2,4,6-trimethylbenzoyl)phosphine oxide/2-hydroxy-2-methylpropiophenone, 4'-ethoxyacetophenone, 3'-hydroxyacetophenone, 1-hydroxycyclohexyl phenyl ketone, 2-hydroxy-4'-(2-hydroxyethoxy)-2-methylpropiophenone, 2-hydroxy-2-methylpropiophenone, 2-Methyl-4'-(methylthio)-2-morpholinopropiophenone, 4'-phenoxyacetophenone, and combinations thereof.

The polymerization initiator can be a thermal initiator. Exemplary thermal initiators include azo initiators such as azobisisobutyronitrile (AIBN), 1,1'-azobis(cyclohexane-1-carbonitrile) (V-40), 2,2'-azobis(4-methoxy-2.4-dimethyl valeronitrile) (V-70), 2,2'-azobis(2.4-dimethyl valeronitrile) (V-65), dimethyl 2,2'-azobis(2-methylpropionate) (V-601), 2,2'-azobis(2-methylbutyronitrile) (V-59), 2,2'-azobis[N-(2-propenyl)-2-methylpropionamide] (VF-096), 1-[(1-cyano-1-methylethyl)azo]formamide (V-30), 2,2'-azobis(N-butyl-2-methylpropionamide) (VAm-110), and 2,2'-azobis(N-cyclohexyl-2-methylpropionamide) (VAm-111). Additional azo initiators include 2,2'-azobis[2-(2-imidazolin-2-yl)propane] (VA-061), 2,2'-azobis{2-methyl-N-[1,1-bis(hydroxymethyl)-2-hydroxyethyl]propionamide} (VA-080), and 2,2'-azobis[2-methyl-N-(2-hydroxyethyl)propionamide] (VA-086). Combinations of the foregoing azo initiators are also included. The temperature of thermal initiation depends upon the specific initiator used. In general, thermal initiation may occur at temperatures of 22° C. to 150° C., specifically 60° C. to 120° C.

Other exemplary initiators include peroxides, such as alkyl, diallyl, aryl, and diaryl peroxides. Exemplary peroxides include tert-butyl peroxide, di-tert-butyl peroxide, benozyl peroxide, lauroyl peroxide (LUPEROX™), methyl ethyl ketone peroxide, acetone peroxide, and benzoyl peroxide. Peroxides are also thermal initiators which work at temperatures of 22° C. to 150° C., specifically 60° C. to 120° C.

In some embodiments, the polymerizable mixture may be crosslinked by ionizing radiation (X-rays or gamma rays), or at a wavelength about 254 nm without the aid of a polymerization initiator. Ionizing radiation having a wavelength of about 1 nm to about $10^{-5}$ nm is generally suitable for crosslinking.

The functionalized anionic gemini surfactant comprising carboxylate headgroups such as in structure (Ia) and (Ic) may be prepared by contacting a carboxylic acid with at least two equivalents of a sufficiently strong base capable of deprotonating the alpha carbon of the carboxylic acid. Deprotonation of the alpha carbon of the carboxylic acid yields a carbanion that is reactive with compound comprising leaving groups. Suitable bases include alkyl lithiums, alkylmagnesium reagents, lithium diisopropylamide, lithium tetramethylpiperidine, dialkylamide base, sodium hydride, and potassium hydride, among other suitable strong bases. The reaction suitably occurs in aprotic solvent, e.g., tetrahydrofuran, diethyl ether, any alkane solvent, any aromatic solvent, alkylamine solvents, alkyl diamine solvents, alkyl phosphoramide solvents or mixtures thereof.

The carboxylate compound containing the reactive carbanion is then contacted with a compound comprising the Y moiety terminated with leaving groups, which may be depicted:

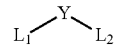

wherein $L_1$ and $L_2$ comprise leaving groups, Y comprises a connecting moiety. The molar ratio is generally about 2 moles deprotonated carboxylate to 1 mole compound containing the Y moiety. Appropriate leaving groups include bromide, iodide, chloride, tosylate, mesylate, triflate, and benzenesulfonate and p-toluenesulfonate. This contact thereby yields a gemini dicarboxylate salt, e.g., a lithium gemini dicarboxylate if a lithium reagent is used to deprotonate the alpha carbon. Upon workup and isolation, this yields a dicarboxylic acid. This dicarboxylic acid may be deprotonated with a base (e.g., sodium hydroxide, potassium hydroxide, ammonium hydroxide, tetramethylammonium hydroxide, etc.) to thereby prepare a variety of gemini dicarboxylates with a desired charge balancing counterion.

The functionalized anionic gemini surfactant according to structure (Ia) can be prepared by processes described in International Patent Publication No. WO2013112552A1 incorporated by reference herein.

The functionalized cationic gemini surfactant comprising ammonium headgroups such as in structure (Ib-1) and (Id-1) may be prepared, for example, by contacting a tetraalkyl α,ω-diaminoalkane with two equivalents of a compound comprising a functional group capable of undergoing a thiol-ene reaction (optionally protected with a protecting group as needed), the $X_1$ or $X_2$ group as described herein, and wherein the compound is terminated with one leaving group ($L_3$), the compound of which may be depicted as

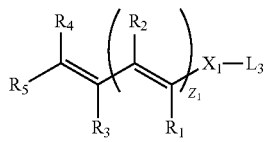

for structure (Ib-1), or depicted as

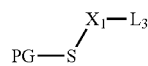

for structure (Id-1) wherein $L_3$ comprises a leaving group, PG is a protecting group, and $X_1$, $Z_1$, and $R_{1-5}$ are as defined above. The molar ratio is generally about 2 moles of the compound containing the $L_3$ moiety to 1 mole tetraalkyl diaminoalkane. Appropriate leaving groups include bromide, iodide, chloride, tosylate, mesylate, triflate, benzenesulfonate and p-toluenesulfonate. This contact thereby yields a gemini diammonium salt, e.g. diammonium dibromide gemini if a brominated reagent is used. The reaction suitably occurs in solvent such as acetone, tetrahydrofuran, diethyl ether, any alkane solvent, any aromatic solvent or any alcohol. Suitable processes can be found in U.S. Patent Application Publication US 2012/0211424 A1 by Gabriel et al. incorporated herein by reference in its entirety. The functionalized cationic gemini surfactant comprising ammonium headgroups such as in structure (Ib-2) and (Id-2) may be prepared, for example, by contacting gemini surfactant (Ia) and (Ic), respectively, with a two equivalents of a dialkylamine capable of undergoing condensation reactions to form a bis(dialkylamide). Contacting this bis(dialkylamide) using a suitable reducing agent, such as lithium aluminum hydride, affords a diallyl amine that may be reacted with an alkyl halide to quaternized the amine, thereby producing the desired cationic gemini surfactant.

Also disclosed herein are polymers prepared by polymerizing (crosslinking) the functionalized ionic gemini surfactant with the thiol-ene crosslinking agent, optionally in the presence of solvents, a polymerization initiator, or a combination of solvents and a polymerization initiator. The polymerization can be effected by light, ionizing radiation, heat, or a combination thereof.

In an embodiment, the polymer is in the form of a porous polymer film or membrane. The polymers may be formed in nearly any dimension or geometry. In some embodiments, the thickness of the membrane or bulk material may be about 1 micrometers to about 5 millimeters, such as about 10 micrometers to about 5 millimeters.

The membranes may be formed as a film between two plates (the plates may be transparent if cross-linking is achieved through photopolymerization), or may be formed on or within a porous support. The support may be of a suitable material known to those skilled in the art including polymers, metals, and ceramics. In some embodiments, the support is a porous polymeric material. In some embodiments, the porous support is polyethylene (including high molecular weight and ultra-high molecular weight polyethylene), polyacrylonitrile (PAN), polyacrylonitrile-co-polyacrylate, polyacrylonitrile-co-methacrylate, polysulfone (PSF), polyethersulfone (PES), Nylon 6, 6, poly(vinylidene difluoride) or polycarbonate. Methods for forming composite membranes comprising polymers according to the present disclosure attached to a porous support are described in PCT/US2003/031429 and U.S. Patent Application Publication US 2006/0096922 by Gin et al., hereby incorporated by reference for their disclosure of methods to form composite membranes. In some embodiments, the composite membrane prepared by crosslinking the functionalized ionic gemini surfactant with the thiol-ene crosslinking agent and a porous support may be prepared by applying a polymerizable mixture comprising functionalized ionic gemini surfactant monomer, thiol-ene crosslinking agent, solvent and optional polymerization initiator to the support followed by polymerization. Application of the mixture to the support can be achieved by any solution based process known to the art, including painting, rolling, spraying, spin coating and inkjet printing of the solution onto the support. The solution is applied to form a coating on at least a portion of the surface of the support. The solvent may be evaporated from the film at ambient temperature. Temperatures and controlled atmospheres as known by those skilled in the art can be used to evaporate the solvent from the film.

In some embodiments, the polymer is formed on network glasses, particularly silicate glass, fluoride glass, aluminosilicates, phosphate glasses, borate glasses, and chalcogenide glass. The polymer comprising polymerized gemini surfactants may be formed on metal substrates, e.g., copper, aluminum, zinc, etc. for use as, for example, ion transport films in batteries.

In an embodiment, a method of preparing a polymer comprises forming a polymerizable mixture comprising a functionalized ionic gemini surfactant as described herein and a thiol-ene crosslinking agent; and crosslinking the functionalized ionic gemini surfactant with the thiol-ene crosslinking agent to form the polymer. Further within this embodiment, the method comprises, prior to crosslinking, forming a lyotropic liquid crystal structure from a mixture of the functionalized ionic gemini surfactant, the thiol-ene crosslinking agent, and a polar solvent. The solvent may be removed from the crosslinked lyotropic liquid crystal by evaporation, for example, to provide a substantially solvent-free polymer.

The following examples illustrate specific embodiments with the scope of the present disclosure. The examples are provided for the purpose of illustration and are not to be construed as limitations of the present disclosure.

EXAMPLE 1

Preparation and Photopolymerization of Bulk Dicarboxylate LLC

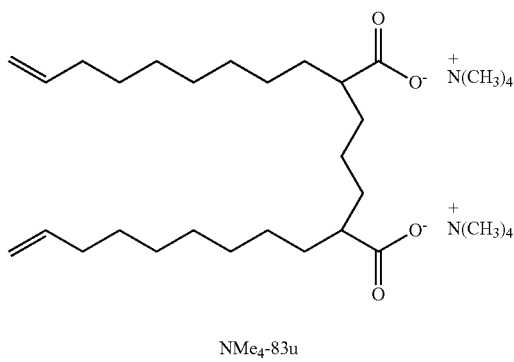

NMe$_4$-83u

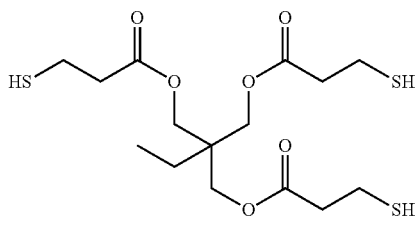

TMTMP

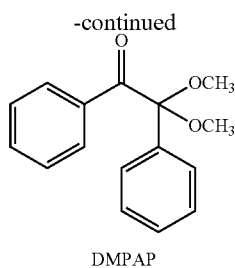

DMPAP

Materials. The unsaturated gemini dicarboxylate surfactant (NMe₄-83u) was synthesized in two synthetic steps from commercially available starting materials as described previously by Sorenson et al. and stored under argon due to its highly hygroscopic nature. Trimethylolpropane tris(3-mercaptopropionate) (TMTMP) was purchased from Sigma-Aldrich and used as received. The photoinitiator 2,2-Dimethoxy-2-phenylacetophenone (DMPAP) was purchased from Sigma Aldrich and used as received. Deionized water was purified using a Thermo Scientific Barnstead NANOpure™ system (18 MΩ resistivity).

NMe₄-83u (43.4 mg) was weighed into a dry amber vial in an Ar glovebox. TMTMP (21.1 mg) and DMPAP (0.9 mg) were added to the vial. Benzene (1 ml) was added and the mixture was sonicated for 5 min, after which time a homogeneous solution formed. The mixture was then frozen in liquid nitrogen and dried under vacuum for 6 h. To the resulting solid, deionized water (27.8 mg) was added. The mixture was centrifuged at 5650 rpm for 10 min before being manually mixed. This procedure was repeated 3 times in order to achieve a homogeneous gel.

A number of LLCs were prepared with varying weight fractions of water relative to hydrophobic components (NMe₄-83u, TMTMP and DMPAP), but keeping a constant NMe₄-83u:TMTMP ratio (1:1 with respect to reactive functional groups). The self-assembly behavior was investigated by SAXS and compared with binary gemini:water gels at a range of compositions (FIGS. 2A and 2B). The morphologies assigned from peak patterns at each concentration are consistent between gemini:trithiol:water and gemini:water LLCs. At 50 and 60 wt % water, hexagonally packed cylinders form, whilst at 20-40 wt % water, double gyroid morphology is obtained.

Bulk LLC photopolymerization. LLCs were prepared as described above and sandwiched between quartz slides separated by a 250 μm Teflon spacer in order to control thickness. Vacuum grease was applied around the spacer in order to reduce exposure to atmospheric oxygen and to minimize the occurrence of water loss during polymerization. The quartz sandwich was placed on a heating mantle set to 50° C. and equilibrated for 30 min. A UV lamp (UVGL-58 6 W handheld UV lamp, UV Products, LLC) was positioned above the sample, and a stainless steel ring placed in between such that the lamp-sample distance was 0.5". The sample was irradiated with 365 nm light for 6 h. CAUTION: The UV lamp should be appropriately shielded during the photopolymerization to mitigate exposure to potentially harmful UV light.

Characterization of bulk LLCs was conducted by small angle X-ray scattering (SAXS) using a Bruker D8 Discover equipped with a VANTEC-500 detector and calibrated with silver behenate standards. Samples were irradiated for 5 minutes at room temperature. The resulting 2D SAXS patterns were azimuthally integrated using the DataSqueeze software package, in order to obtain one-dimensional scattering profiles (FIGS. 2A, 2B, and 3).

FIG. 3 displays the SAXS patterns associated with the NMe₄-83u/TMTMP/DMPAP/water bulk gel containing 30 wt % water, before and after photopolymerization. The SAXS patterns exhibited by the uncrosslinked and crosslinked gels could be indexed to the double gyroid LLC phase with a unit cell dimension d~78 Å. The gyroid LLC morphology obtained in the non-covalent assembly is retained upon photopolymerization, and with a significant degree of long-range order (ascertained from the multitude of higher order peaks observed in the SAXS trace).

EXAMPLE 2

Preparation and Photopolymerization of Bulk Diammonium LLC

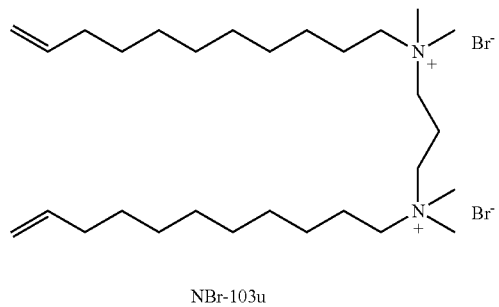

NBr-103u

Materials. The unsaturated gemini diammonium surfactant (NBr-103u) was synthesized in one step from commercially available starting materials as described above, and stored under argon due to its highly hygroscopic nature. All other chemicals were used as received without further purifications.

NBr-103u (35.4 mg) was weighed into a dry amber vial in an Ar glovebox. TMTMP (16.1 mg) and DMPAP (0.9 mg) were added to the vial. Benzene (1 ml) was added and the mixture was sonicated for 5 min, after which time a homogeneous solution formed. The mixture was then frozen in liquid nitrogen and dried under vacuum for 6 h. To the resulting solid, deionized water (9.1 mg) was added. The mixture was centrifuged at 5650 rpm for 10 min before being manually mixed. This procedure was repeated 3 times in order to achieve a homogeneous gel.

Bulk LLC photopolymerization. LLCs were prepared as described above and sandwiched between quartz slides separated by a 250 μm spacer in order to control thickness. Vacuum grease was applied around the spacer in order to reduce exposure to atmospheric oxygen, and to minimize the occurrence of water loss during polymerization. The quartz sandwich was placed on a heating mantle set to 50° C. and equilibrated for 30 min. A UV lamp (UVGL-58 6 W handheld UV lamp, UV products LLC) was positioned above the sample, and a stainless steel spacer placed in between such that the lamp-sample distance was 0.5". The sample was irradiated with 365 nm light for 6 h. CAUTION: The UV lamp should be appropriately shielded during the photopolymerization to mitigate exposure to potentially harmful UV light.

Characterization of bulk LLCs was conducted by small angle X-ray scattering (SAXS) using a Bruker D8 Discover equipped with a VANTEC-500 detector and calibrated with silver behenate standards. Samples were irradiated for 10 minutes at room temperature. The resulting 2D SAXS patterns were azimuthally integrated using the DataSqueeze software package, in order to obtain one-dimensional scattering profiles (FIG. 4).

Figure 4:
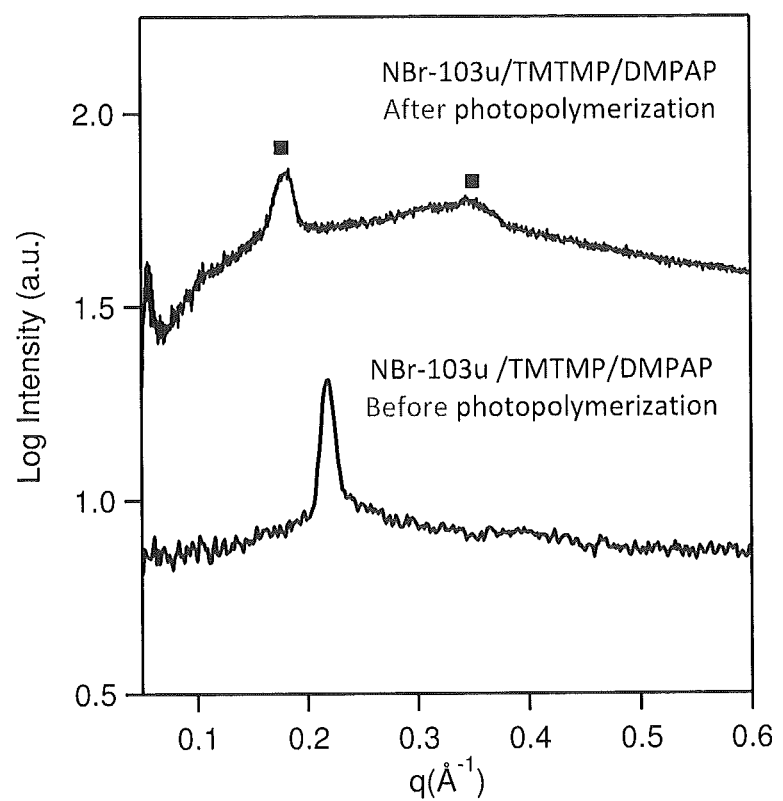
FIG. 4 shows azimuthally-integrated SAXS patterns of NBr-103u/TMTMP/DMPAP/water LLCs containing 10 wt % water before and after crosslinking photopolymerization. The peaks labelled in the upper plot are assigned to the (100) and (200) Bragg reflections, associated with lamellar LLC morphology.

FIG. 4 displays the SAXS patterns associated with the NBr-103u/TMTMP/DMPAP/water bulk gel containing 10 wt % water, before and after photopolymerization. The shift of the primary scattering peak to lower q upon photopolymerization indicates an increase in LLC domain spacing. The relative positions of the two peaks in the polymer SAXS trace suggest the crosslinked LLC assembly had lamellar morphology, with unit cell size d~36 Å.

EXAMPLE 3

Preparation and Photopolymerization of Dicarboxylate LLC Film on a Macroporous Polymer Support Materials. Solupor 3P07A (macroporous polyethylene) was purchased from Lydall and used as received. All other chemicals were used as received without further purifications.

$NMe_4$-83u (31.2 mg) weighed into a dry amber vial in an Ar glovebox. TMTMP (23.3 mg), DMPAP (0.7 mg) and deionized $H_2O$ (14.7 mg) were added to the vial. Ethanol (1.6 g) was added and the mixture was sonicated for 5 min, after which time a homogeneous solution formed.

A bottle with a 1" diameter opening was half filled with acetone and a section of macroporous poly(ethylene) (3P07A, Solupor®) was stretched tightly across the top and affixed with a rubber band. The gemini/thiol/photoinitiator solution was repeatedly drop cast nine times onto the stretched PE in 0.05 mL aliquots and allowed to evaporate for 5 min prior to each subsequent addition. The resulting evenly transparent Solupor film was then removed from the solvent jar and dried in vacuo for 2 h at room temperature.

Figure 5:
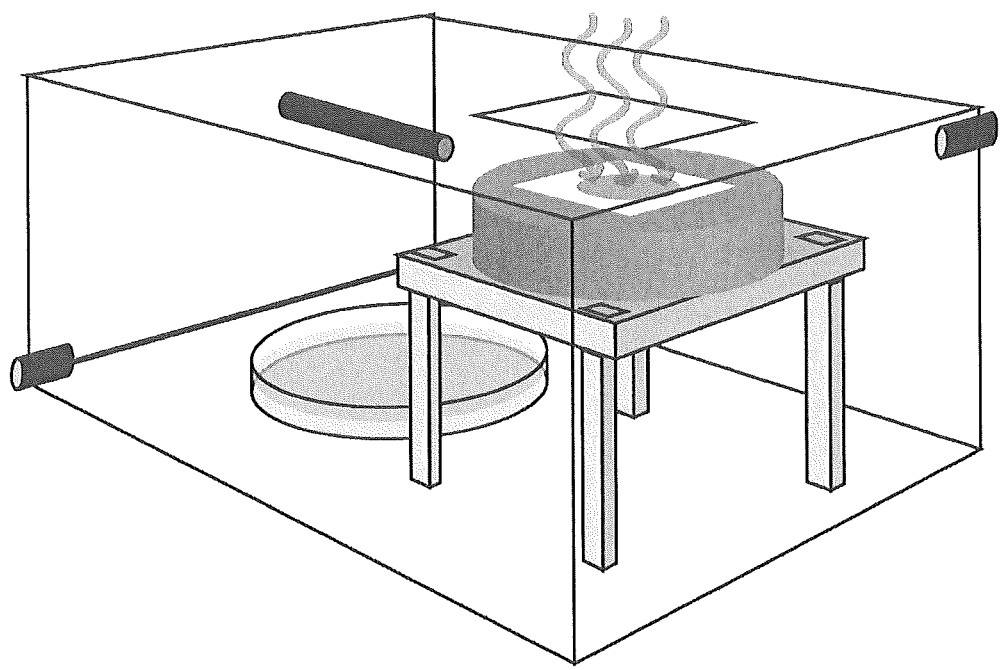
FIG. 5 is a schematic depiction of the controlled environment photopolymerization (CEP) chamber used for photocrosslinking LLC assemblies. This Plexiglas box with gas inlet and outlet, relative humidity (RH) probe, and UV-transparent quartz window was assembled in the University of Wisconsin-Madison Department of Chemistry Machine Shop. The humid environment within the chamber is controlled at 88% RH using saturated KCl(aq) solution in a Petri dish at 22° C., and the samples are placed on top of a quartz plate on a 35° C. thermostatted heating block. Samples are irradiated using a hand-held UV lamp (6 W) through the quartz window in the top of the box.

A custom-built Plexiglas controlled environment photopolymerization (CEP) chamber having a quartz top window equipped with a heating mantle (FIG. 5) was equilibrated with an atmosphere of saturated KCl(aq) solution at 22° C. to establish a 88% RH atmosphere therein. The CEP chamber was additionally flushed with dry $N_2$(g) for 2 h to minimize the presence of oxygen, which is known to reduce the efficiency of free radical photopolymerization reactions. The vacuum dried Solupor-supported $NMe_4$-83/TMTMP/DMPAP film was placed on a quartz slide on top of the heating mantle thermostatted at 35° C., which was situated directly under the quartz window in the top of the CEP chamber. After closing the flow of $N_2$(g) to the chamber, the quiescent system was allowed to reach thermal and RH equilibrium for 2.5 h in order to allow the thin film to take up water and form a supported film LLC assembly.

The Solupor-supported thin film LLC assembly was irradiated at 365 nm with a 6 W UV lamp (UV Products LLC model #UVGL-58) through the UV-transparent quartz window of the CEP chamber with a sample-to-lamp distance of 0.5".

Figure 6:
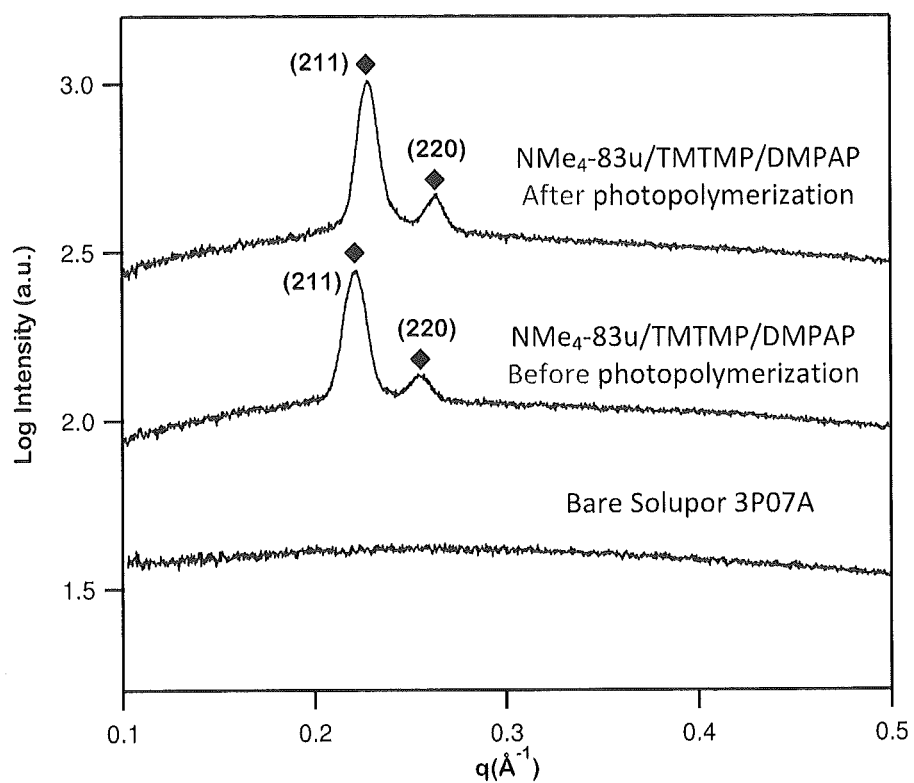
FIG. 6 shows azimuthally-integrated SAXS patterns of bare Solupor 3P07A support, and the Solupor-supported NMe$_4$-83u/TMTMP/DMPAP films before and after crosslinking photopolymerization upon exposure to 365 nm UV radiation. The peaks marked in the top two plots are assigned to the (211) and (220) Bragg reflections, which are characteristic of the double gyroid LLC morphology.

Membrane materials analysis: Small angle X-ray scattering (SAXS) analyses were conducted on a Bruker D8 Discover equipped with a VANTEC-500 detector and calibrated with silver behenate standards. Supported thin films were folded 4 times and irradiated for 15 minutes at room temperature. 2D SAXS patterns were azimuthally integrated using the DataSqueeze software package, in order to obtain one dimensional scattering profiles. FIG. 6 displays the SAXS patterns associated with the bare Solupor support, the Solupor-supported $NMe_4$-83u/TMTMP/DMPAP thin film prior to polymerization, and the same film after UV-irradiation triggered photochemical crosslinking polymerization. The SAXS patterns exhibited by the uncrosslinked and crosslinked films may be indexed to the (211) and (220) Miller indices associated with a double gyroid LLC phase having a unit cell dimension d approximately 67-70 Å. The significance of this result is that the LLC morphology obtained in the non-covalent assembly in retained, albeit with a slight decrease in the unit cell dimension, upon crosslinking photopolymerization.

The use of the terms "a" and "an" and "the" and similar referents (especially in the context of the following claims) are to be construed to cover both the singular and the plural, unless otherwise indicated herein or clearly contradicted by context. The terms first, second etc. as used herein are not meant to denote any particular ordering, but simply for convenience to denote a plurality of, for example, layers. The terms "comprising", "having", "including", and "containing" are to be construed as open-ended terms (i.e., meaning "including, but not limited to") unless otherwise noted. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Any combination of the above-described elements in all possible variations thereof is encompassed by the invention unless otherwise indicated herein or otherwise clearly contradicted by context.

What is claimed is:
1. A polymerizable mixture, comprising:
a functionalized ionic gemini surfactant having the structure (Ia), (Ib-1), (Ib-2), (Ic), (Id-1), or (Id-2):

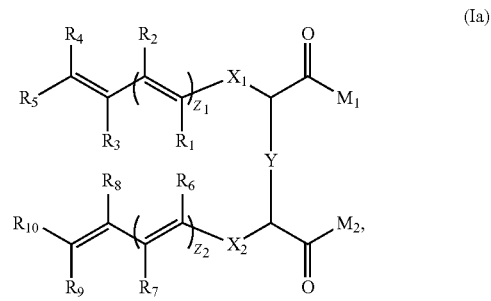

-continued

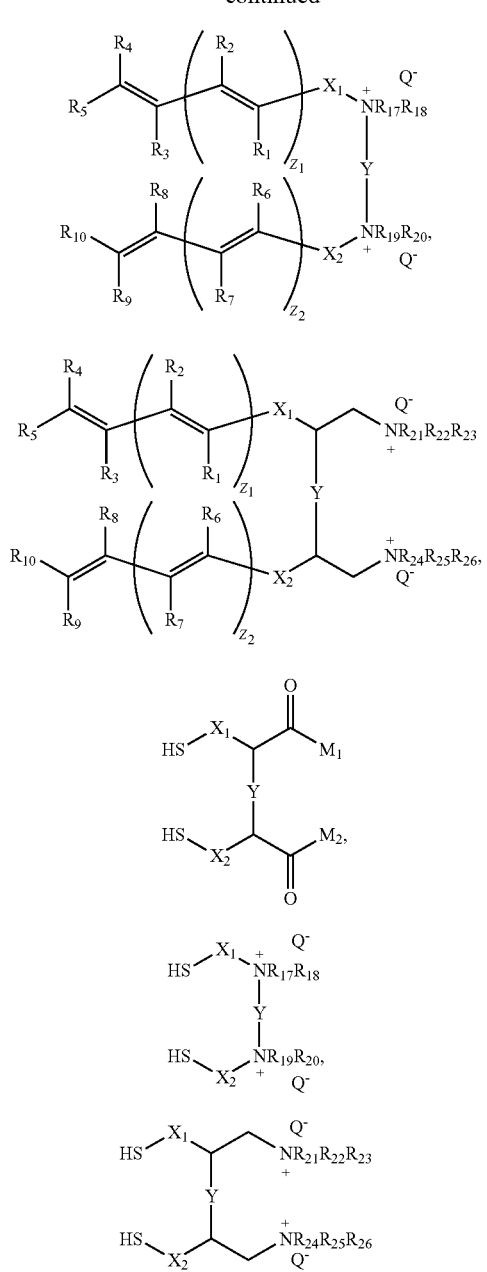

wherein
$X_1$ and $X_2$ are each independently an optionally substituted branched, unbranched, or cyclic aliphatic groups having from four to 30 carbon atoms, with the proviso that the $X_1$ and $X_2$ of structures (Ic), (Id-1), and (Id-2) do not contain an ene group;
$Z_1$ and $Z_2$ are integers, each independently having a value of zero, one, two, or three;
Y is a covalently-bound divalent linker;
$M_1$ and $M_2$ are the same or different and are each independently selected from hydrogen, hydroxyl, —O$^-$ (M$^+$), —OR$_{11}$, —O(C$_1$-C$_8$ alkyl)N(CH$_3$)$_3$$^+$(X$^-$), —(C$_0$-C$_8$ alkyl)NR$_{11}$R$_{12}$, —O(C$_1$-C$_8$ alkyl)NR$_{11}$R$_{12}$, —NH(C$_1$-C$_8$ alkyl)NR$_{11}$R$_{12}$, —NH(CH—R$_{13}$)COOM$^+$, —NR$_{11}$R$_{14}$, —OCH$_2$CH(OH) CH$_2$OH, —NH(C$_1$-C$_8$ alkyl)SO$_3$$^-$M$^+$, —N(CH$_3$)(C$_1$-C$_8$ alkyl)SO$_3$M$^+$, —NH(C$_1$-C$_8$ alkyl)OSO$_3$$^-$M$^+$, —N(CH$_3$)(C$_1$-C$_8$ alkyl)OSO$_3$$^-$ M$^+$, —(C$_1$-C$_8$ alkyl)SO$_3$$^-$M$^+$, —O(C$_1$-C$_8$ alkyl)SO$_3$$^-$M$^+$, —(C$_1$-C$_8$ alkyl)OSO$_3$$^-$M$^+$, —O(C$_1$-C$_8$ alkyl)OSO$_3$$^-$M$^+$, —NH(C$_1$-C$_8$ alkyl)PO$_3$M$^+_2$, —N(CH$_3$)(C$_1$-C$_8$ alkyl)PO$_3$M$^+_2$, —(C$_1$-C$_8$ alkyl)PO$_3$M$^+$2, or —O(C$_1$-C$_8$ alkyl)PO$_3$M$^+_2$ wherein M$^+$ is a counterion, X$^-$ is a counterion, $R_{11}$, $R_{12}$, and $R_{14}$ are independently chosen from hydrogen and optionally substituted C$_1$-C$_8$ alkyl, and $R_{13}$ is an amino acid side chain; and $R_1$ through $R_{10}$ are each independently chosen from hydrogen, fluoride, chloride, bromide, C$_1$-C$_8$ alkyl, C$_2$-C$_8$ alkenyl, tri(C$_1$-C$_4$ alkyl)silyl, and substituted or unsubstituted phenyl;

$R_{17}$ through $R_{20}$ and $R_{21}$ through $R_{26}$ are each independently selected from C$_1$ to C$_3$ alkyl; and Q is a counterion;

a thiol-ene crosslinking agent, wherein the thiol-ene crosslinking agent comprises two or more thiol groups when the functionalized ionic gemini surfactant is structure (Ia), (Ib-1), or (Ib-2), and the thiol-ene crosslinking agent comprises two or more ene groups when the functionalized ionic gemini surfactant is structure (Ic), (Id-1), or (Id-2); and optionally a solvent.

2. The polymerizable mixture of claim 1, wherein the functionalized ionic gemini surfactant has the structure (Ia), (Ib-1), or (Ib-2) and the thiol-ene crosslinking agent comprises two or more thiol groups.

3. The polymerizable mixture of claim 1, wherein the functionalized ionic gemini surfactant has the structure (Ic), (Id-1), or (Id-2) and the thiol-ene crosslinking agent comprises two or more ene groups.

4. The polymerizable mixture of claim 1, wherein
Y is a covalently-bound divalent linker chosen from:
an optionally substituted C$_1$-C$_{20}$ aliphatic group, an optionally substituted C$_1$-C$_{20}$ heteroaliphatic group, which aliphatic and heteroaliphatic groups may be branched, unbranched, or cyclic;
an optionally substituted aryl or heteroaryl group, comprising 1 aromatic ring or 2 or 3 fused rings of which at least one ring is aromatic, wherein each aromatic ring in the aryl or heteroaryl group contains 5-6 ring atoms, with 0-4 heteroatoms independently chosen from N, O, and S with remaining ring atoms being carbon, and each non-aromatic ring in the aryl or heteroaryl group contain 3-7 ring atoms with 0 to 2 heteroatoms independently chosen from N, O, and S and remaining ring atoms being carbon, and wherein the aryl or heteroaryl group optionally comprises one or two C$_1$-C$_5$ aliphatic chains wherein the point of attachment of Y is a carbon in the C$_1$-C$_5$ aliphatic chain; and
an optionally substituted poly(C$_1$-C$_{10}$ alkyl)ether of the formula —C$_0$-C$_3$ alkyl-(O—C$_1$-C$_{10}$ alkyl)$_n$-O—C$_0$-C$_3$ alkyl or an optionally substituted poly(C$_1$-C$_{10}$ alkylcarboxamide) of the formula —C$_0$-C$_3$ alkyl-((C═O)NH—C$_1$-C$_{10}$ alkyl)$_n$-(C═O)NH—C$_0$-C$_3$ alkyl, where n is an integer from 0 to 4.

5. The polymerizable mixture of claim 1, wherein Y is a divalent poly(C$_1$-C$_3$ alkyl)ether of the formula —C$_0$-C$_3$ alkyl-(O—C$_1$-C$_3$ alkyl)$_n$-O—C$_0$-C$_3$ alkyl, where n is an integer from 0 to 4, which is optionally substituted with one or more substituents independently chosen from hydroxy, oxo, C$_1$-C$_3$ alkyl, and C$_1$-C$_3$ alkoxy.

6. The polymerizable mixture of claim 1, wherein each of M$^+$ is independently selected at each occurrence from the group consisting of lithium ion; sodium ion; potassium ion; cesium ion; zinc ion; magnesium ion; calcium ion; ammonium ion; alkylammonium ion having the structure $H_xR_{4-x}N^+$ wherein x is an integer having a value of 0 through 4 and R is selected from the group consisting of methyl, ethyl, propyl, butyl, and combinations thereof; tetrakis(hydroxymethyl) phosphonium ion; tetramethylphosphonium ion;

choline; imidazolium; bis(quaternary ammonium) ion; and combinations thereof.

7. The polymerizable mixture of claim 1, wherein the functionalized ionic gemini surfactant has the structure (IIa), (IIb-1), (IIb-2), (IIc), (IId-1), or (IId-2):

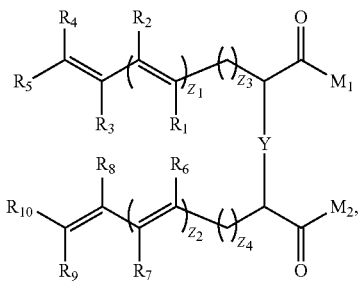
(IIa)

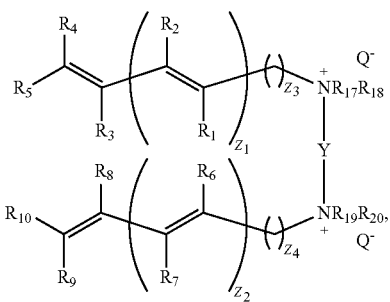
(IIb-1)

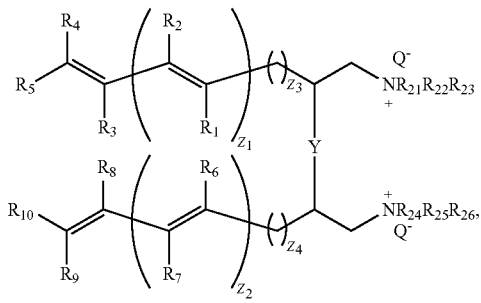
(IIb-2)

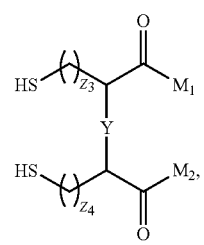
(IIc)

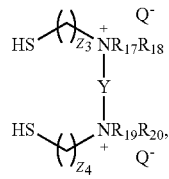
(IId-1)

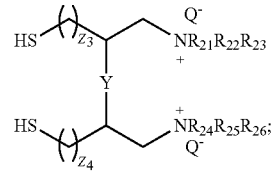
(IId-2)

wherein $Z_3$ and $Z_4$ are integers, each independently having a value between four and twenty.

8. The polymerizable mixture of claim 1, wherein the functionalized ionic gemini surfactant has the structure (IIIa), (IIIb-1), (IIIb-2), (IIIc), (IIId-1), or (IIId-2):

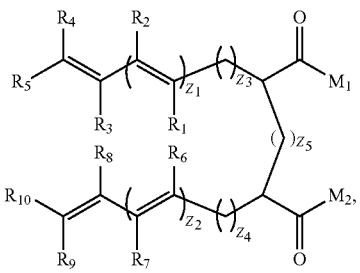
(IIIa)

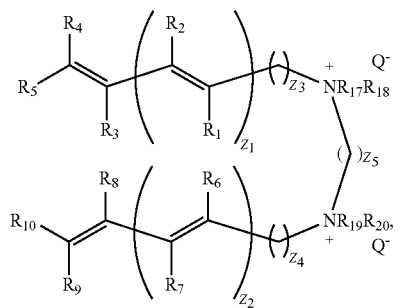
(IIIb-1)

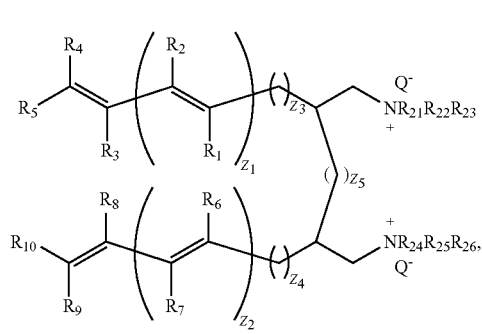
(IIIb-2)

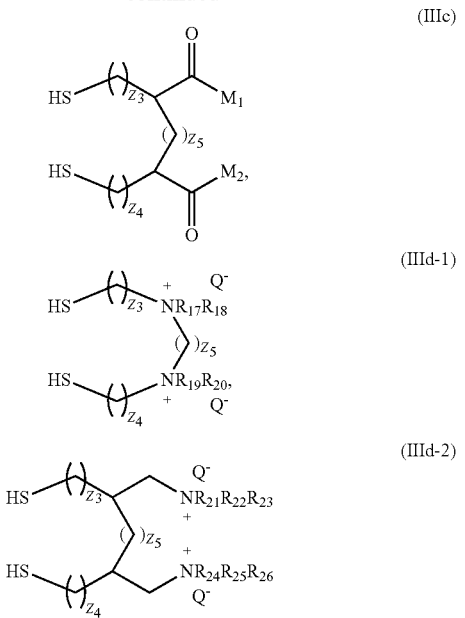

wherein $Z_3$ and $Z_4$ are integers, each independently having a value of four to twenty; and $Z_5$ is an integer having a value of two to twelve.

9. The polymerizable mixture of claim 1, wherein the thiol-ene crosslinking agent comprises two, three, four, or more ene groups or thiol groups.

10. The polymerizable mixture of claim 1, wherein the thiol-ene crosslinking agent comprising thiol groups is trimethylolpropane tris(3-mercaptopropionate); pentaerythritol tetra-(3-mercaptopropionate); 2,2-bis((2-mercaptoacetoxy)methyl)propane-1,3-diyl bis(2-mercaptoacetate); 1,2-ethanedithiol; 1,4-butanedithiol; 1,6-hexanedithiol; dithiothreitol; 2,2-bis(mercaptomethyl)propane-1,3-dithiol; 2-(mercaptomethyl)-2-methylpropane-1,3-dithiol; glycol bis(3-mercaptopropionate); ethoxylated pentaerythritol tetra-(3-mercaptopropionate); polypropylene glycol 3-mercaptopropionate; ethoxylated trimethylpropane tri (3-mercaptopropionate); ethoxylated glycol dimercaptoacetate; 1,4-bis(3-mercaptobutylyloxy)butane; pentaerithrytol tetrakis (3-mercaptobutylate); 1,3,5-Tris(3-mercaptobutyloxethyl)-1,3,5-triazine-2,4,6(1H,3H, 5H)-trione; or a combination thereof; and wherein the thiol-ene crosslinking agent comprising ene groups is a pentaerythritol or 2-ethyl-2-(hydroxymethyl)propane-1,3-diol functionalized at each alcohol group with a vinyl, allyl, acrylate, methacrylate, thioacrylate, or thiomethacrylate group; heptane-1,7-diyl diacrylate; hexane-1,6-diyl diacrylate; pentane-1,5-diyl diacrylate; butane-1,4-diyl diacrylate; 1,7-bis(vinyloxy) heptane; 1,6-bis(vinyloxy)hexane; 1,5-bis(vinyloxy) pentane; 1,4-bis(vinyloxy)butane; 1,7-bis(allyloxy) heptane; 1,6-bis(allyloxy)hexane; 1,5-bis(allyloxy) pentane; 1,4-bis(allyloxy)butane; 1-(allyloxy)-2,2-bis (allyloxymethyl)butane; 2-(acryloyloxymethyl)-2-ethylpropane-1,3-diyl diacrylate; or a combination thereof.

11. The polymerizable mixture of claim 1, further comprising a polymerization initiator.

12. The polymerizable mixture of claim 11, wherein the polymerization initiator comprises i) a photoinitiator selected from the group consisting of 2,2-dimethoxy-2-phenylacetophenone, 2,2-diethoxyacetophenone, 2-benzyl-2-(dimethylamino)-4'-morpholinobutyrophenone, 4'-tert-butyl-2',6'-dimethylacetophenone, diphenyl(2,4,6-trimethylbenzoyl)phosphine oxide/2-hydroxy-2-methylpropiophenone, 4'-ethoxyacetophenone, 3'-hydroxyacetophenone, 1-hydroxycyclohexyl phenyl ketone, 2-hydroxy-4'-(2-hydroxyethoxy)-2-methylpropiophenone, 2-hydroxy-2-methylpropiophenone, 2-methyl-4'-(methylthio)-2-morpholinopropiophenone, 4'-phenoxyacetophenone, and combinations thereof; or ii) a thermal initiator selected from the group consisting of azobisisobutyronitile (AIBN), 1,1'-azobis(cyclohexane-1-carbonitrile) (V-40), 2,2'-azobis(4-methoxy-2,4-dimethyl valeronitrile) (V-70), 2,2'-azobis(2,4-dimethyl valeronitrile) (V-65), dimethyl 2,2'-azobis(2-methylpropionate) (V-601), 2,2'-azobis(2-methylbutyronitrile) (V-59), 2,2'-azobis[N-(2-propenyl)-2-methylpropionamide] (VF-096), 1-[(1-cyano-1-methylethyl)azo]formamide (V-30), 2,2'-azobis(N-butyl-2-methylpropionamide) (VAm-110), 2,2'-azobis(N-cyclohexyl-2-methylpropionamide) (VAm-111), 2,2'-azobis[2-(2-imidazolin-2-yl)propane] (VA-061), 2,2'-azobis{2-methyl-N-[1,1-bis(hydroxymethyl)-2-hydroxyethl] propionamide} (VA-080), 2,2'-azobis[2-methyl-N-(2-hydroxyethyl)propionamide] (VA-086), a peroxide, and combinations thereof.

13. The polymerizable mixture of claim 1, comprising a polar solvent.

14. The polymerizable mixture of claim 13, further comprising a hydrophobic co-solvent.

15. The polymerizable mixture of claim 13, in a form of a triply periodic multiply continuous lyotropic phase.

16. A polymer prepared from the polymerizable mixture of claim 1 by crosslinking the functionalized ionic gemini surfactant with the thiol-ene crosslinking agent.

17. The polymer of claim 16, in a form of a porous polymer film.

18. A method of preparing a polymer, comprising:

forming a polymerizable mixture comprising a functionalized ionic gemini surfactant and a thiol-ene crosslinking agent; and crosslinking the functionalized ionic gemini surfactant with the thiol-ene crosslinking agent to form the polymer;

wherein the functionalized ionic gemini surfactant has the structure (Ia), (Ib-1), (Ib-2), (Ic), (Id-1), or (Id-2):

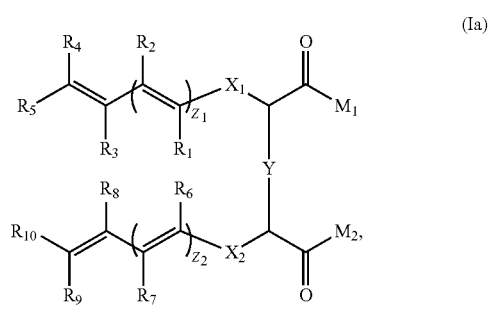

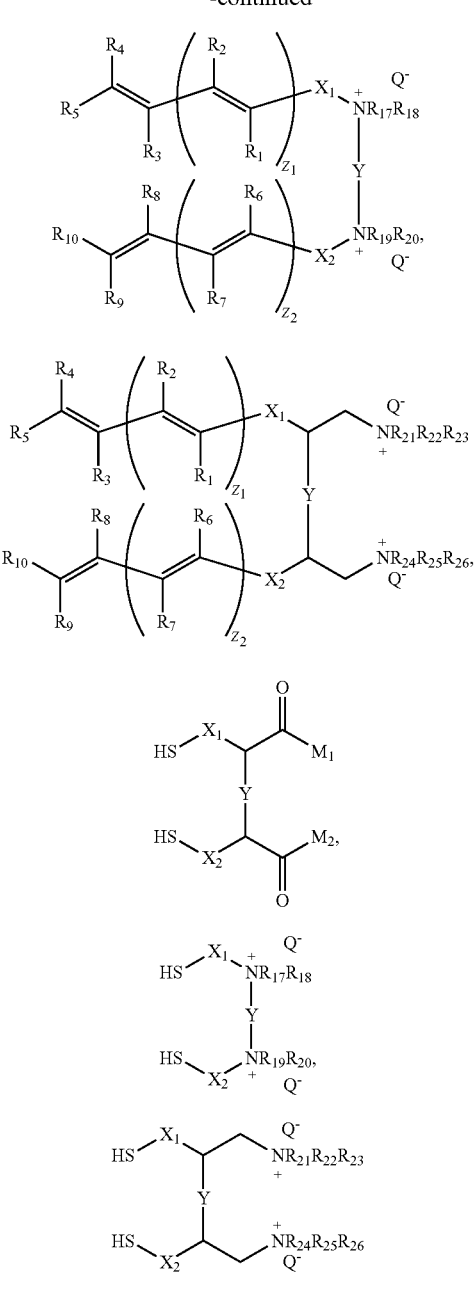

wherein

X$_1$ and X$_2$ are each independently an optionally substituted branched, unbranched, or cyclic aliphatic groups having from four to 30 carbon atoms, with the proviso that the X$_1$ and X$_2$ of structures (Ic), (Id-1), and (Id-2) do not contain an ene group;

Z$_1$ and Z$_2$ are integers, each independently having a value of zero, one, two, or three;

Y is a covalently-bound divalent linker;

M$_1$ and M$_2$ are the same or different and are each independently selected from hydrogen, hydroxyl, —O$^-$(M$^+$), —OR$_{11}$, —O(C$_1$-C$_8$ alkyl)N(CH$_3$)$_3$$^+$(X$^-$), —(C$_0$-C$_8$ alkyl)NR$_{11}$R$_{12}$, —O(C$_1$-C$_8$ alkyl)NR$_{11}$R$_{12}$, —NH(C$_1$-C$_8$ alkyl)NR$_{11}$R$_{12}$, —NH(CH—R$_{13}$)COOM$^+$, —NR$_{11}$R$_{14}$, —OCH$_2$CH(OH)CH$_2$OH, —NH(C$_1$-C$_8$ alkyl)SO$_3$$^-$M$^+$, —N(CH$_3$)(C$_1$-C$_8$ alkyl)SO$_3$$^-$M$^+$, —NH(C$_1$-C$_8$ alkyl)OSO$_3$$^-$M$^+$, —N(CH$_3$)(C$_1$-C$_8$ alkyl)OSO$_3$$^-$M$^+$, —(C$_1$-C$_8$ alkyl)SO$_3$$^-$M$^+$, —O(C$_1$-C$_8$ alkyl)SO$_3$$^-$M$^+$, —(C$_1$-C$_8$ alkyl)OSO$_3$$^-$M$^+$, —O(C$_1$-C$_8$ alkyl)OSO$_3$$^-$M$^+$, —NH(C$_1$-C$_8$ alkyl)PO$_3$M$^+$$_2$, —N(CH$_3$)(C$_1$-C$_8$ alkyl)PO$_3$M$^+$$_2$, —(C$_1$-C$_8$ alkyl)PO$_3$M$^+$2, or —O(C$_1$-C$_8$ alkyl)PO$_3$M$^+$$_2$ wherein M$^+$ is a counterion, X$^-$ is a counterion, R$_{11}$, R$_{12}$, and R$_{14}$ are independently chosen from hydrogen and optionally substituted C$_1$-C$_8$ alkyl, and R$_{13}$ is an amino acid side chain; and R$_1$ through R$_{10}$ are each independently chosen from hydrogen, fluoride, chloride, bromide, C$_1$-C$_8$ alkyl, C$_2$-C$_8$ alkenyl, tri(C$_1$-C$_4$ alkyl)silyl, and substituted or unsubstituted phenyl;

R$_{17}$ through R$_{20}$ and R$_{21}$ through R$_{26}$ are each independently selected from C$_1$ to C$_3$ alkyl; and Q is a counterion; and wherein the thiol-ene crosslinking agent comprises two or more thiol groups when the functionalized ionic gemini surfactant is structure (Ia), (Ib-1), or (Ib-2) and the thiol-ene crosslinking agent comprises two or more ene groups when the functionalized ionic gemini surfactant is structure (Ic), (Id-1), or (Id-2).

19. The method of claim 18, wherein the polymerizable mixture further comprises a polar solvent, a polymerization initiator, or a combination thereof.

20. The method of claim 18, further comprising prior to crosslinking, forming a lyotropic liquid crystal structure from a mixture of the functionalized ionic gemini surfactant, the thiol-ene crosslinking agent, and a polar solvent.

21. A lyotropic liquid crystal composition, comprising:

a functionalized ionic gemini surfactant having the structure (Ia), (Ib-1), (Ib-2), (Ic), (Id-1), or (Id-2):

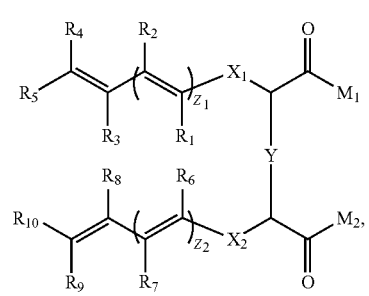

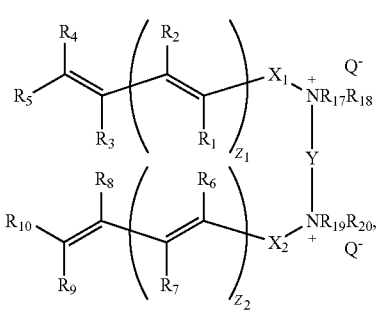

-continued

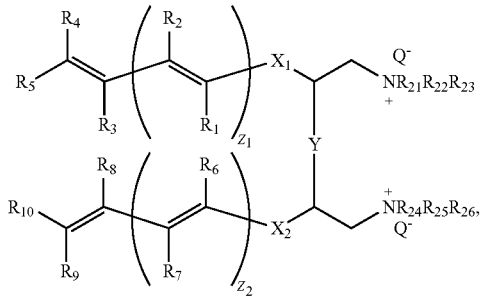

(Ib-2)

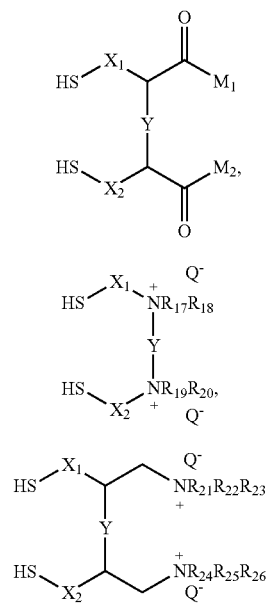

(Ic)

(Id-1)

(Id-2)

wherein $X_1$ and $X_2$ are each independently an optionally substituted branched, unbranched, or cyclic aliphatic groups having from four to 30 carbon atoms, with the proviso that the $X_1$ and $X_2$ of structures (Ic), (Id-1), and (Id-2) do not contain an ene group;

$Z_1$ and $Z_2$ are integers, each independently having a value of zero, one, two, or three;

Y is a covalently-bound divalent linker;

$M_1$ and $M_2$ are the same or different and are each independently selected from hydrogen, hydroxyl, —O⁻ ($M^+$), —$OR_{11}$, —O($C_1$-$C_8$ alkyl)N($CH_3$)$_3^+$($X^-$), —($C_0$-$C_8$ alkyl)$NR_{11}R_{12}$, —O($C_1$-$C_8$ alkyl)$NR_{11}R_{12}$, —NH($C_1$-$C_8$ alkyl)$NR_{11}R_{12}$, —NH(CH—$R_{13}$)COO$M^+$, —$NR_{11}R_{14}$, —$OCH_2CH(OH)CH_2OH$, —NH($C_1$-$C_8$ alkyl)$SO_3M^+$, —N($CH_3$)($C_1$-$C_8$ alkyl)$SO_3^-M^+$, —NH($C_1$-$C_8$ alkyl)$OSO_3^-M^+$, —N($CH_3$)($C_1$-$C_8$ alkyl)$OSO_3^-M^+$, —($C_1$-$C_8$ alkyl)$SO_3^-M^+$, —O($C_1$-$C_8$ alkyl)$SO_3^-M^+$, —($C_1$-$C_8$ alkyl)$OSO_3^-M^+$, —O($C_1$-$C_8$ alkyl)$OSO_3^-M^+$, —NH($C_1$-$C_8$ alkyl)$PO_3M^+_2$, —N($CH_3$)($C_1$-$C_8$ alkyl)$PO_3M^+_2$, —($C_1$-$C_8$ alkyl)$PO_3M^+2$, or —O($C_1$-$C_8$ alkyl)$PO_3M^+_2$ wherein $M^+$ is a counterion, $X^-$ is a counterion, $R_{11}$, $R_{12}$, and $R_{14}$ are independently chosen from hydrogen and optionally substituted $C_1$-$C_8$ alkyl, and $R_{13}$ is an amino acid side chain; and $R_1$ through $R_{10}$ are each independently chosen from hydrogen, fluoride, chloride, bromide, $C_1$-$C_8$ alkyl, $C_2$-$C_8$ alkenyl, tri($C_1$-$C_4$ alkyl)silyl, and substituted or unsubstituted phenyl;

$R_{17}$ through $R_{20}$ and $R_{21}$ through $R_{26}$ are each independently selected from $C_1$ to $C_3$ alkyl; and Q is a counterion;

a thiol-ene crosslinking agent, wherein the thiol-ene crosslinking agent comprises two or more thiol groups when the functionalized ionic gemini surfactant is structure (Ia), (Ib-1), or (Ib-2), and the thiol-ene crosslinking agent comprises two or more ene groups when the functionalized ionic gemini surfactant is structure (Ic), (Id-1), or (Id-2); and a polar solvent.

22. The lyotropic liquid crystal composition of claim 21, in the form of a polymer formed by crosslinking the functionalized ionic gemini surfactant with the thiol-ene crosslinking agent.

* * * * *